United States Patent
Shinohara

(10) Patent No.: US 7,859,736 B2
(45) Date of Patent: Dec. 28, 2010

(54) METHOD FOR MANUFACTURING ELECTRO-OPTIC DEVICE AND ELECTRO-OPTIC DEVICE

(75) Inventor: Takashi Shinohara, Suwa (JP)

(73) Assignee: Sony Corporation, Tokyo (JP)

( * ) Notice: Subject to any disclaimer, the term of this patent is extended or adjusted under 35 U.S.C. 154(b) by 238 days.

(21) Appl. No.: 12/256,601

(22) Filed: Oct. 23, 2008

(65) Prior Publication Data

US 2009/0109532 A1    Apr. 30, 2009

(30) Foreign Application Priority Data

Oct. 24, 2007    (JP)    ................ 2007-276066

(51) Int. Cl.
*G02F 1/03*    (2006.01)
*G02F 1/1335*    (2006.01)

(52) U.S. Cl. .............. 359/245; 349/106; 349/107; 349/108; 349/123; 349/155

(58) Field of Classification Search ............. 359/245, 359/265–275, 296, 462; 349/42, 43, 56, 349/84, 106, 107, 114, 123, 138, 139, 141, 349/144, 155–157; 345/50, 87, 88, 90
See application file for complete search history.

(56) References Cited

U.S. PATENT DOCUMENTS 5,831,765 A * 11/1998 Nakayama et al. ......... 359/464
6,429,840 B1 * 8/2002 Sekiguchi .................. 345/88
6,952,249 B2 * 10/2005 Matsuoka et al. .......... 349/129
7,443,468 B2 * 10/2008 Okita et al. ................. 349/107
7,599,023 B2 * 10/2009 Narutaki et al. ............ 349/106
7,646,467 B2 * 1/2010 Youn et al. ................. 349/187
7,675,589 B2 * 3/2010 Kurasawa .................. 349/106
2005/0219693 A1    10/2005 Hartkop et al.

FOREIGN PATENT DOCUMENTS

GB    2 405 542 A    3/2005
JP    2007-108501    4/2007

* cited by examiner

*Primary Examiner*—Loha Ben
(74) *Attorney, Agent, or Firm*—K&L Gates LLP

(57) ABSTRACT

A method for manufacturing an electro-optic device including: a display surface; a plurality of pixels including at least a first pixel for forming a first image and a second pixel for forming a second image and emitting light toward the display surface; a filter that allows, of the light, light emitted from the first pixel to a first range through the display surface to pass through, and light emitted from the second pixel to a second range through the display surface to pass through; and a substrate between the plurality of pixels and the filter. The method includes: providing the filter on the substrate, with the distance between the substrate and the filter kept at a distance set according to the thickness of the substrate.

10 Claims, 28 Drawing Sheets

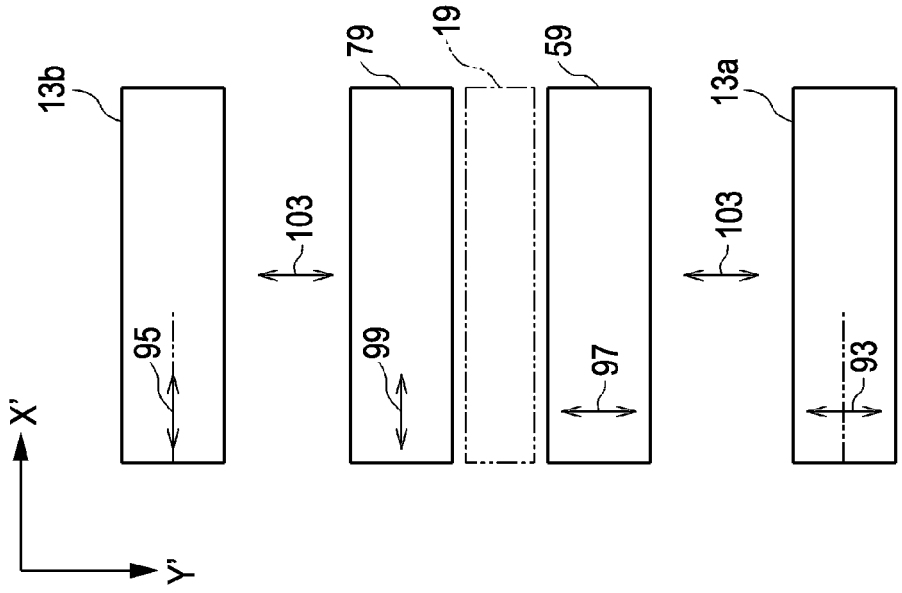
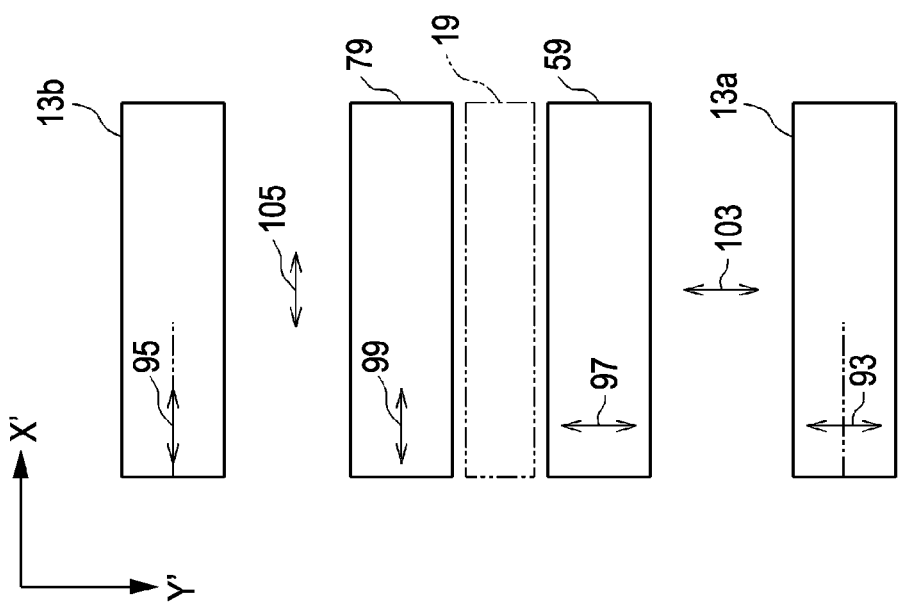

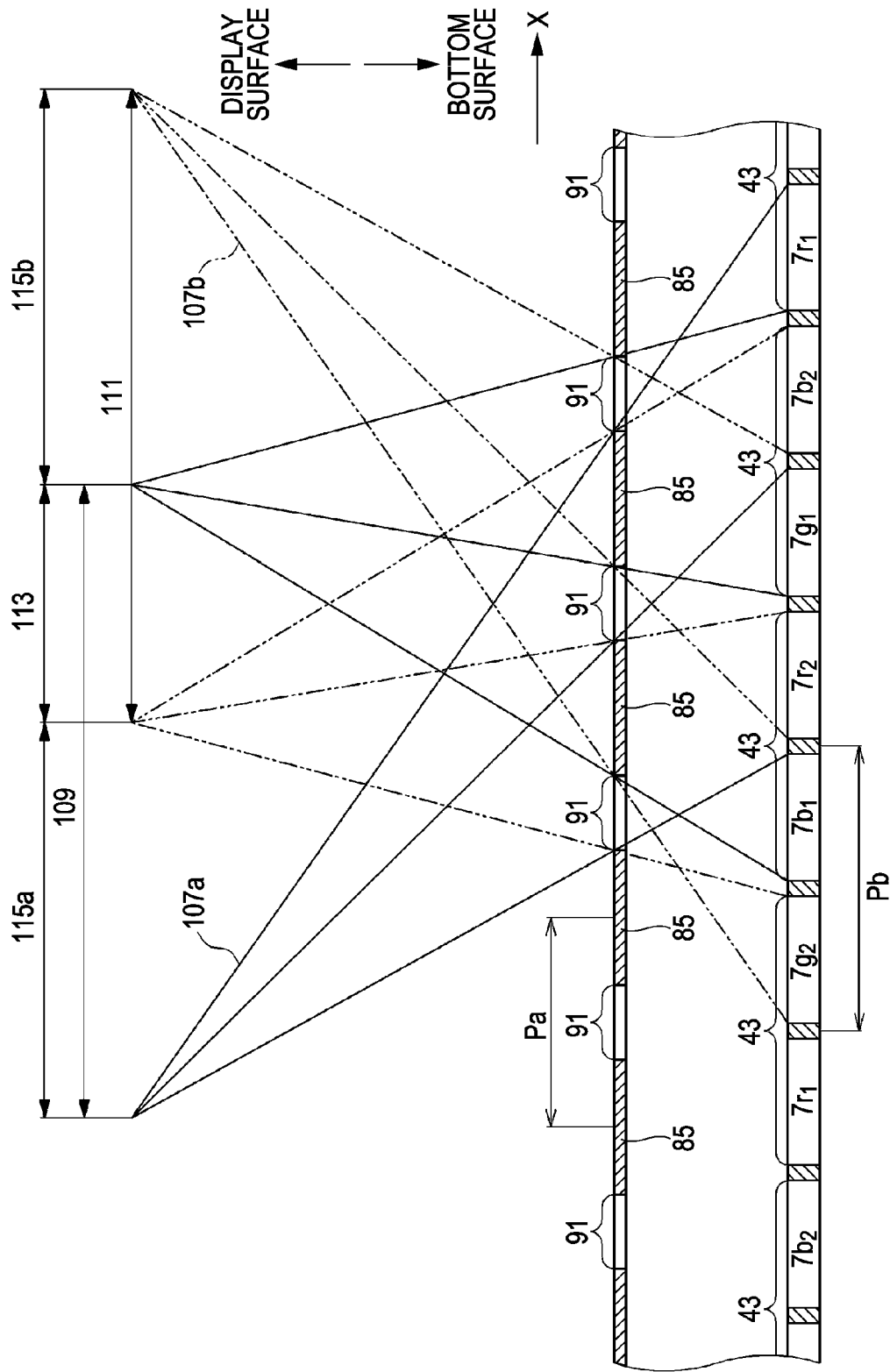

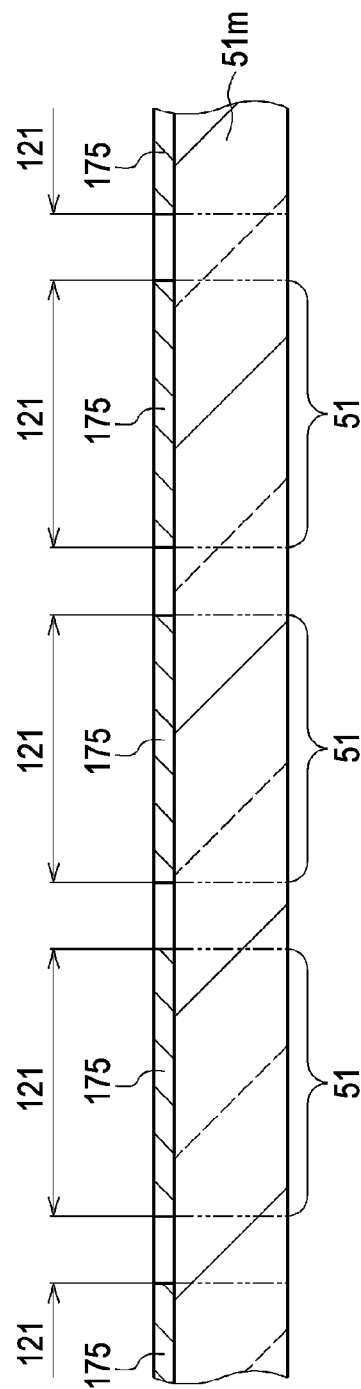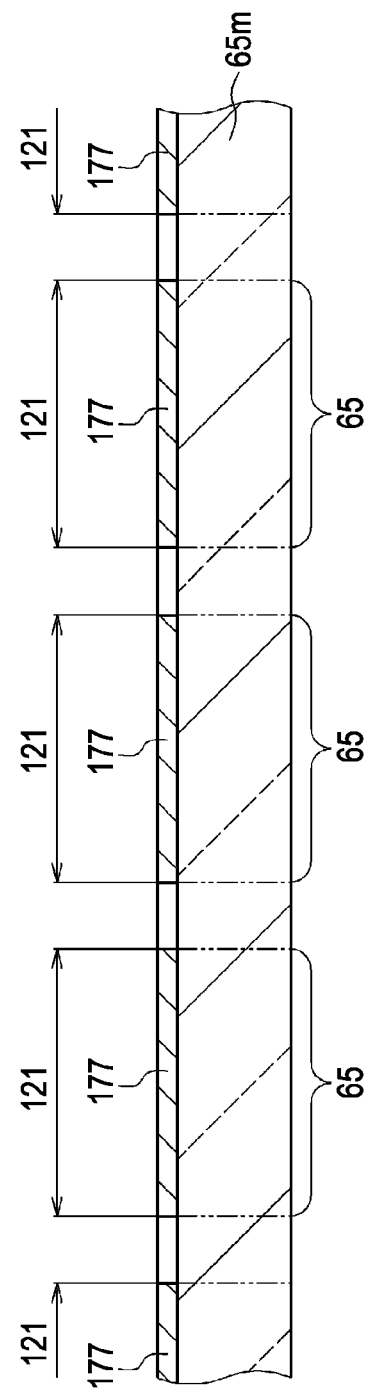

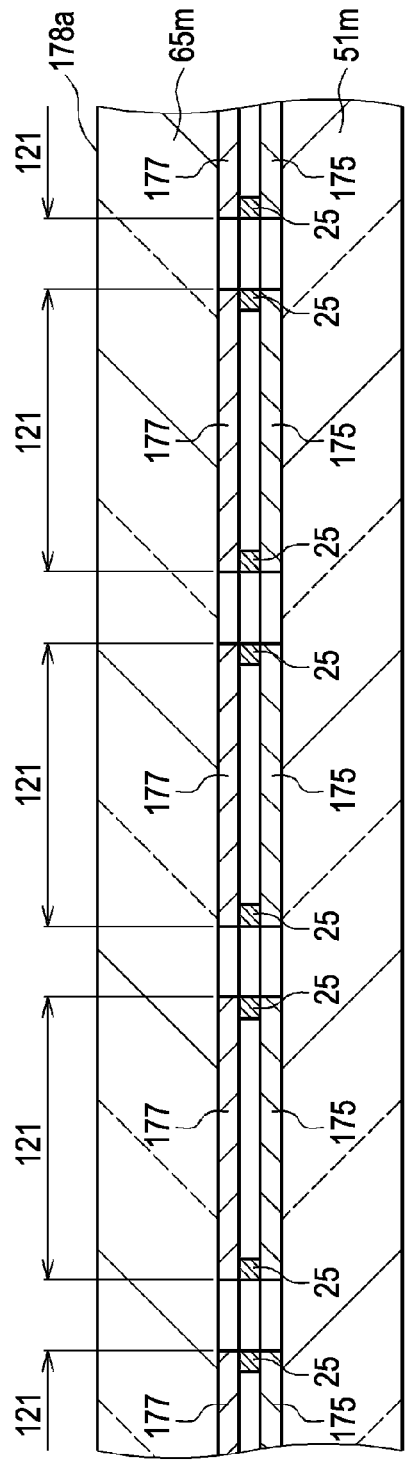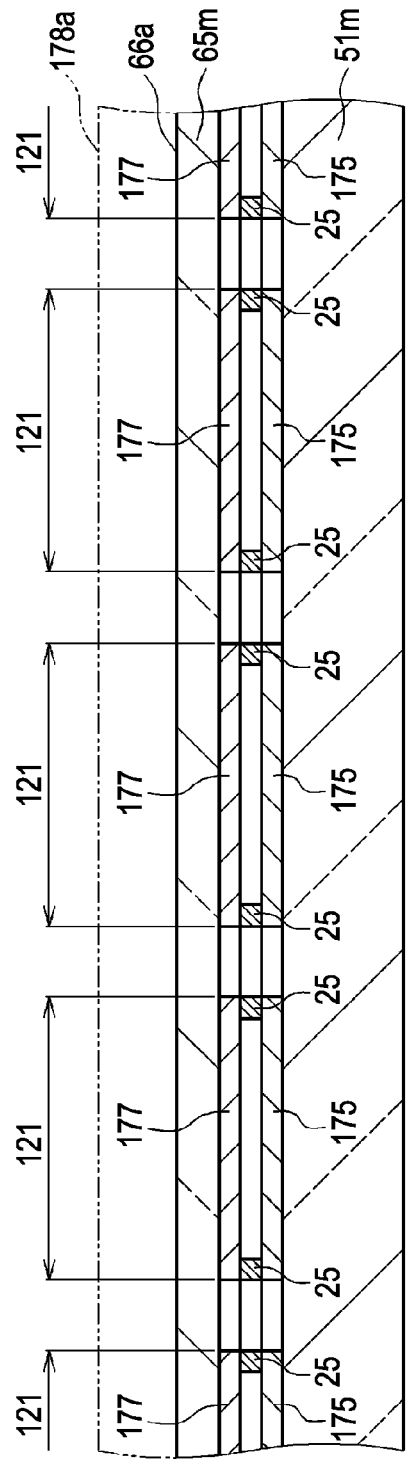

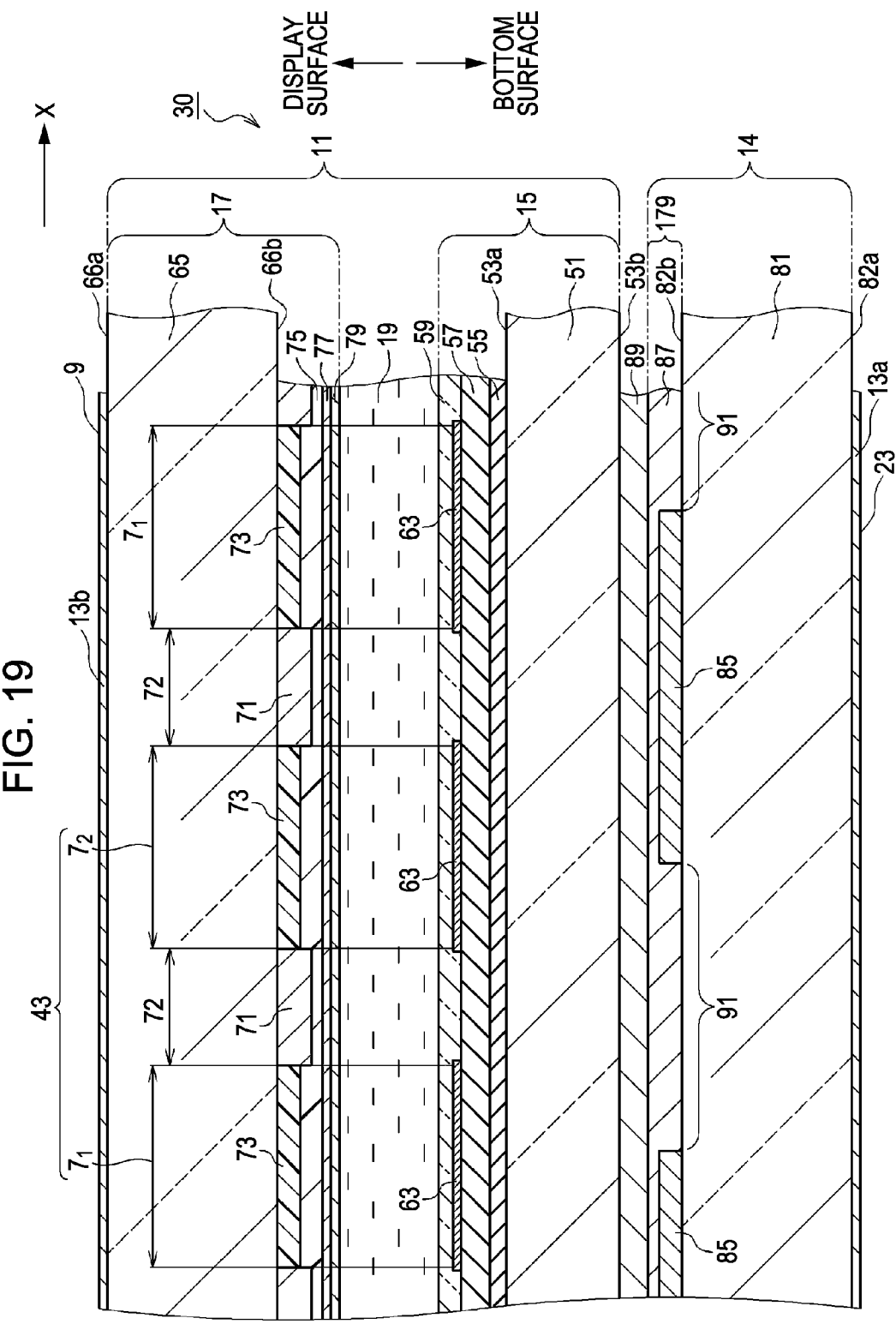

METHOD FOR MANUFACTURING ELECTRO-OPTIC DEVICE AND ELECTRO-OPTIC DEVICE

BACKGROUND

1. Technical Field

The present invention relates to a method for manufacturing an electro-optic device and the electro-optic device.

2. Related Art

Known examples of electro-optic devices include a display device capable of displaying images differently according to viewing directions as viewed from two or more directions (hereinafter, referred to as directional display). Some of such display devices can display different images for two or viewing points through a barrier having openings and light-shielding portions (for example, refer to JP-A-2007-108501 (pp. 4-5, FIG. 18).

Here, a system for performing directional display in two directions by a display device having a display panel on which an image is displayed and the above-mentioned barrier will be described using a cross-section. As shown in FIG. 28A, a display panel 600 includes first pixels 601 for displaying a first image and second pixels 603 for displaying a second image. Light-shielding portions 607 of a barrier 605 each overlaps with a part 601a of each first pixel 601 and a part 603a of each second pixel 603. That is, an opening 609 located between the light-shielding portions 607 is provided in an area overlapping with the other part 601b of the first pixel 601 and the other part 603b of the second pixel 603.

The first image is displayed in a first range 611 in which the first pixel 601 can be viewed through the opening 609. The second image is displayed in a second range 613 in which the second pixel 603 can be viewed through the opening 609. That is, if an eye point is in the first range 611, the first image can be viewed from the eye point. If an eye point is in the second range 613, the second image can be viewed from the eye point. The first range 611 and the second range 613 have an overlapping range 615. The first image and the second image can be viewed in a superimposed state from an eye point in the range 615.

Only the first image can be viewed from an eye point in a range 619a of the first range 611 except the range 615. Similarly, only the second image can be viewed from an eye point in a range 619b of the second range 613 except the range 615. The range 619a and the range 619b are referred to as a preferred viewing range 619a and a preferred viewing range 619b, respectively. As shown in FIG. 28B, these preferred viewing ranges 619a and 619b can be enlarged by reducing the distance L between the display panel 600 and the barrier 605.

Such a display panel on which the barrier is put generally has a structure in which display elements are placed between a pair of glass substrates. To enlarge the preferred viewing range with such a structure, the glass substrate on which the barrier is put must be thin. In this case, the glass substrate can be thinned by polishing or the like.

However, such polishing of the glass substrate causes variations in the thickness of the glass substrate due to variations in polishing process. This may cause variations in preferred viewing range among a plurality of display devices.

In short, there is the unsolved problem that variations in preferred viewing range can hardly be reduced.

SUMMARY

An advantage of some aspects of the invention is that at least part of the above problems can be solved, which can be achieved by the following embodiments or applications.

First Application

According to a first aspect of the invention, there is provided a method for manufacturing an electro-optic device including: a display surface; a plurality of pixels including at least a first pixel for forming a first image and a second pixel for forming a second image and emitting light toward the display surface; a filter that allows, of the light, light emitted from the first pixel to a first range through the display surface to pass through, and light emitted from the second pixel to a second range through the display surface to pass through; and a substrate between the plurality of pixels and the filter. The method includes: providing the filter on the substrate, with the distance between the substrate and the filter kept at a distance set according to the thickness of the substrate.

The electro-optic device manufactured by the method of the first application includes a display surface, a plurality of pixels, a filter, and a substrate. The substrate is disposed between the pixels and the filter. The pixels include at least a first pixel and a second pixel. The filter allows light emitted from the first pixel to a first range through the display surface to pass through, and allows light emitted from the second pixel to a second range through the display surface to pass through. That is, the light emitted from the first pixel toward the display surface reaches the first range through the filter, and the light emitted from the second pixel toward the display surface reaches the second range through the filter. Thus the first image formed by the first pixel can be viewed from the first range, and the second image formed by the second pixel can be viewed from the second range. In other words, the electro-optic device manufactured by the method of the first application is capable of directional display in at least two directions.

The method for manufacturing the electro-optic device of the first application has a process step of providing the filter on the substrate, with the distance between the substrate and the filter kept at a distance set according to the thickness of the substrate. This manufacturing method allows the distance between the substrate and the filter to be kept at a distance set according to the thickness of the substrate. Accordingly, the distance between the pixels and the filter can be equalized even if the thickness of the substrate varies among a plurality of electro-optic devices. This facilitates decreasing variations in preferred viewing range among the plurality of electro-optic devices.

Second Application

It is preferable that, in providing the filter on the substrate, the substrate and the filter be bonded together with an adhesive.

With the second application, the substrate and the filter are bonded together with an adhesive in the process step of providing the filter on the substrate. This reduces a load on the substrate which is applied when the filter is provided on the substrate as compared with a case in which the substrate and the filter are bonded by welding or the like.

Third Application

It is preferable that the method for manufacturing the electro-optic device further include: providing a spacer layer for controlling the distance on at least one of the substrate and the filter before providing the filter on the substrate.

In the third application, the spacer layer is provided on at least one of the substrate and the filter before the step of providing the filter on the substrate. This facilitates keeping the interval between the substrate and the filter at a distance set according to the thickness of the substrate.

Fourth Application

It is preferable that, in providing the spacer layer, the spacer layer be disposed on the substrate.

In the fourth application, the spacer layer is disposed on the substrate in providing the spacer layer. This reinforces the substrate using the spacer layer.

Fifth Application

It is preferable that, in providing the spacer layer, the spacer layer be disposed on the filter.

In the fifth application, the spacer layer is disposed on the filter in the process step of providing the spacer layer. This allows the filter to be protected by the spacer layer.

Sixth Application

It is preferable that the method for manufacturing the electro-optic device further include: decreasing the thickness of the substrate before providing the filter on the substrate.

In the sixth application, the substrate is thinned before the process step of providing the filter on the substrate. This can reduce the distance between the pixels and the filter, thereby increasing the preferred viewing range.

Seventh Application

It is preferable that the plurality of pixels be disposed between the substrate and a second substrate joined to the substrate in such a manner as to be opposed to the substrate; and in decreasing the thickness of the substrate, the substrate be decreased in thickness, with the second substrate joined to the substrate.

In the seventh application, the substrate is thinned with the second substrate joined to the substrate. This facilitates handling of the thinned substrate.

Eighth Application

It is preferable that the method for manufacturing the electro-optic device further include measuring the thickness of the substrate before providing the filter on the substrate.

In the eighth application, the thickness of the substrate is measured before the process step of providing the filter on the substrate. This allows the distance between the substrate and the filter to be set according to the measurement of the thickness.

Ninth Application

It is preferable that, in providing the filter on the substrate, the distance between the substrate and the filter be kept at the distance according to the amount of the adhesive.

In the ninth application, in the process step of providing the filter on the substrate, the distance between the substrate and the filter is kept at a distance set according to the thickness of the substrate using the amount of the adhesive. This allows the substrate and the filter to be joined together, with the interval between the substrate and the filter kept at the distance set according to the thickness of the substrate.

Tenth Application

According to a second aspect of the invention, there is provided an electro-optic device including: a display surface; a plurality of pixels including at least a first pixel for forming a first image and a second pixel for forming a second image and emitting light toward the display surface; a filter that allows, of the light, light emitted from the first pixel to a first range through the display surface to pass through, and light emitted from the second pixel to a second range through the display surface to pass through; a substrate between the plurality of pixels and the filter; and a spacer layer between the substrate and the filter, the spacer layer controlling the distance between the substrate and the filter.

The electro-optic device of the tenth application includes a display surface, a plurality of pixels, a filter, and a substrate. The substrate is disposed between the pixels and the filter. The pixels include at least a first pixel and a second pixel. The filter allows light emitted from the first pixel to a first range through the display surface to pass through, and allows light emitted from the second pixel to a second range through the display surface to pass through. That is, the light emitted from the first pixel toward the display surface reaches the first range through the filter, and the light emitted from the second pixel toward the display surface reaches the second range through the filter. Thus the first image formed by the first pixel can be viewed from the first range, and the second image formed by the second pixel can be viewed from the second range. In other words, the electro-optic device of the tenth application is capable of directional display in at least two directions.

The electro-optic device of the tenth application has, between the substrate and the filter, a spacer layer for controlling the distance between the substrate and the filter. Accordingly, the distance between the pixels and the filter can be equalized even if the thickness of the substrate varies among a plurality of the electro-optic devices. This facilitates decreasing variations in preferred viewing range among multiple electro-optic devices.

Eleventh Application

According to a third aspect of the invention, there is provided a method for manufacturing an electro-optic device including: a display surface; a plurality of pixels including at least a first pixel for forming a first image and a second pixel for forming a second image and emitting light toward the display surface; an optical element that allows, of the light, light emitted from the first pixel to a first range through the display surface to pass through, and light emitted from the second pixel to a second range through the display surface to pass through; and a substrate between the plurality of pixels and the optical element. The method includes: providing the optical element on the substrate, with the distance between the substrate and the optical element kept at a distance set according to the thickness of the substrate.

Twelfth Application

According to a fourth aspect of the invention, there is provided an electro-optic device including: a display surface; a plurality of pixels including at least a first pixel for forming a first image and a second pixel for forming a second image and emitting light toward the display surface; an optical element that allows, of the light, light emitted from the first pixel to a first range through the display surface to pass through, and light emitted from the second pixel to a second range through the display surface to pass through; a substrate between the plurality of pixels and the optical element; and a spacer layer between the substrate and the optical element, the spacer layer controlling the distance between the substrate and the optical element.

BRIEF DESCRIPTION OF THE DRAWINGS

The invention will be described with reference to the accompanying drawings, wherein like numbers reference like elements.

FIG. 9A is a diagram illustrating the polarization of the display device of this embodiment.

FIG. 9B is a diagram illustrating the polarization of the display device of this embodiment.

FIG. 10 is a schematic cross-sectional view of the plurality pixel groups and the plurality of light-shielding films of the embodiment.

FIG. 11A is a diagram illustrating a method for manufacturing a driving-element substrate according to the embodiment.

FIG. 11B is a diagram illustrating a method for manufacturing a counter substrate according to the embodiment.

FIG. 13A is a diagram illustrating a method for manufacturing a liquid-crystal panel according to the embodiment.

FIG. 13B is a diagram illustrating a method for manufacturing the liquid-crystal panel according to the embodiment.

FIG. 19 is a cross-sectional view of a display panel according to another embodiment taken along a line corresponding to line VII-VII in FIG. 6.

DESCRIPTION OF EXEMPLARY EMBODIMENTS

A display device, one example of electro-optic devices, according to an embodiment of the invention, will be described with reference to the drawings.

Figure 1:
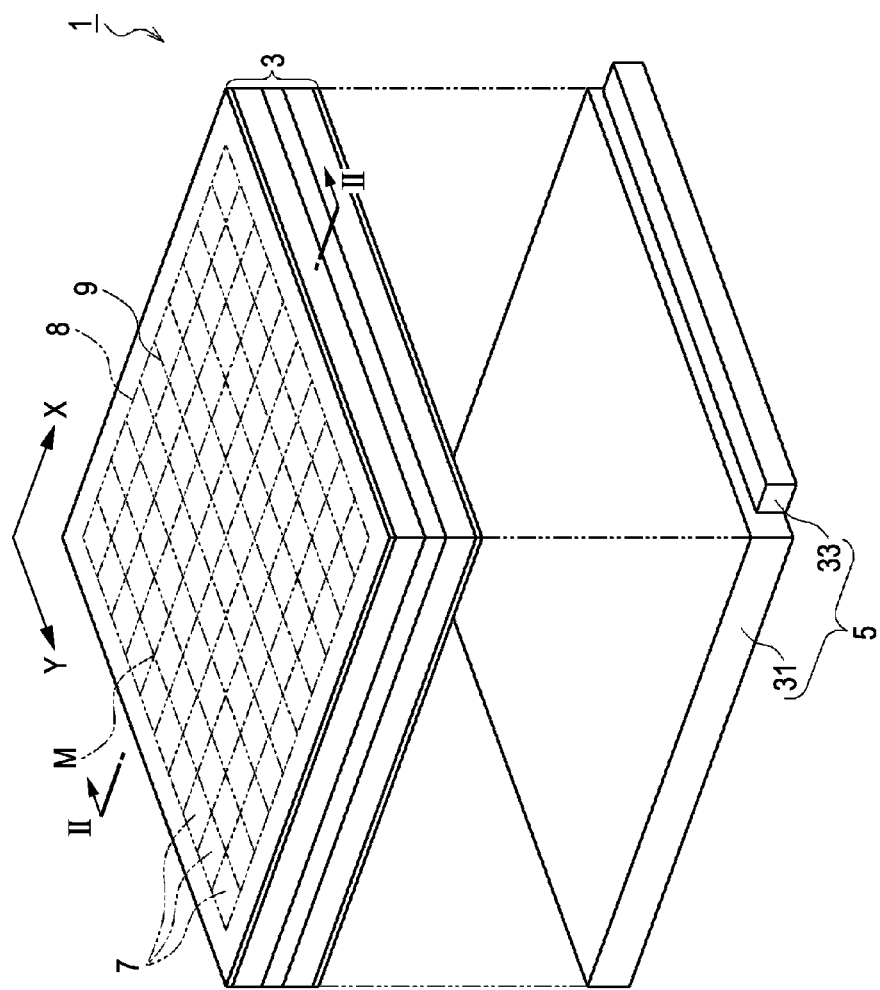
FIG. 1 is an exploded perspective view of the principal structure of a display device according to an embodiment of the invention.

As shown in FIG. 1, the display device, denoted by numeral 1, of this embodiment includes a display panel 3 and an illumination system 5.

The display panel 3 has a plurality of pixels 7. The pixels 7 are arrayed in the X-direction and the Y-direction of the drawing in a display area 8 to configure a matrix M with the X-direction as a raw direction and the Y-direction as a column direction. The display device 1 can display an image on a display surface 9 by selectively emitting light, which is emitted from the illumination system 5 into the display panel 3, out of the display panel 3 via the pixels 7 on the display panel 3 and through the display surface 9. The display area 8 is an area in which an image can be displayed. For ease of understanding, FIG. 1 shows the pixels 7 exaggerated and decreased in number.

Figure 2:
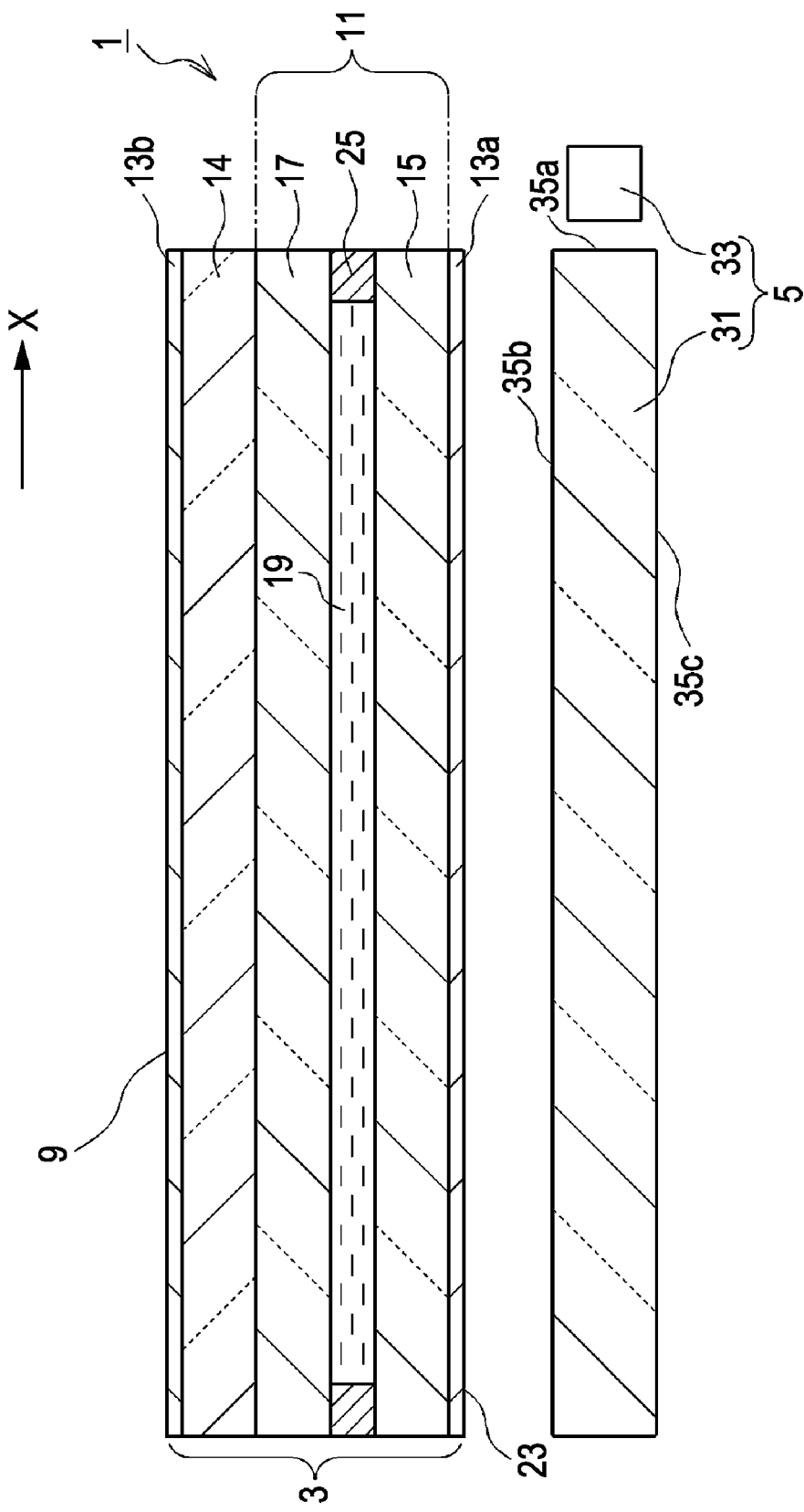
FIG. 2 is a cross-sectional view taken along line II-II in FIG. 1.

As shown in FIG. 2, a cross-section taken along line II-II of FIG. 1, the display panel 3 includes a liquid-crystal panel 11, polarizers 13a and 13b, and a filter substrate 14.

The liquid crystal panel 11 includes a driving-element substrate 15, a counter substrate 17, and liquid crystal 19.

The driving-element substrate 15 has switching elements corresponding to the pixels 7, respectively, to be described later, on the surface adjacent to the display surface 9, or the liquid crystal 19.

The counter substrate 17 is disposed at a position adjacent to the display surface 9 so as to be opposed to the driving-element substrate 15 with a space therebetween. The counter substrate 17 is provided with a counter electrode on the surface adjacent to the bottom surface 23 of the display panel 3 corresponding to the back surface of the display surface 9, that is, adjacent to the liquid crystal 19.

The liquid crystal 19 is disposed between the driving-element substrate 15 and the counter substrate 17, and is sealed between the driving-element substrate 15 and the counter substrate 17 by a sealing member 25 that encloses the display area 8 inside the frame of the display panel 3. The liquid crystal 19 of this embodiment adopts a twisted nematic (TN) type.

The filter substrate 14 is opposed to the counter substrate 17 at a position adjacent to the display surface 9 with respect to the counter substrate 17.

The polarizer 13a is disposed on the surface of the driving-element substrate 15 adjacent to the bottom surface 23. The polarizer 13b is disposed on the surface of the filter substrate 14 adjacent to the display surface 9. In this display device 1, the polarizers 13a and 13b are set such that the direction of the light transmitting axis of the polarizer 13a and the direction of the light transmitting axis of the polarizer 13b intersect at right angles. The polarizers 13a and 13b allow lights with polarizing axes along their respective light transmitting axes to pass therethrough.

The illumination system 5 is disposed at a position adjacent to the bottom surface 23 of the display panel 3, and includes a light guide 31 and a light source 33. The light guide 31 is disposed below the display panel 3 as viewed in FIG. 2, and has a light-exiting surface 35b opposed to the bottom surface 23 of the display panel 3.

The light source 33 adopts a light emitting diode (LED) or a cold-cathode tube, and is disposed on the right of a side 35a of the light guide 31 as viewed in FIG. 2.

Light from the light source 33 enters the side 35a of the light guide 31. The light that enters the light guide 31 exits from the light-exiting surface 35b while being repeatedly reflected in the light guide 31. The light leaving the light-exiting surface 35b enters the display panel 3 from the bottom surface 23 of the display panel 3 through the polarizer 13a. The light guide 31 is provided with a diffuser on the light-exiting surface 35b and a reflector on a bottom surface 35c, as necessary.

Figure 3:
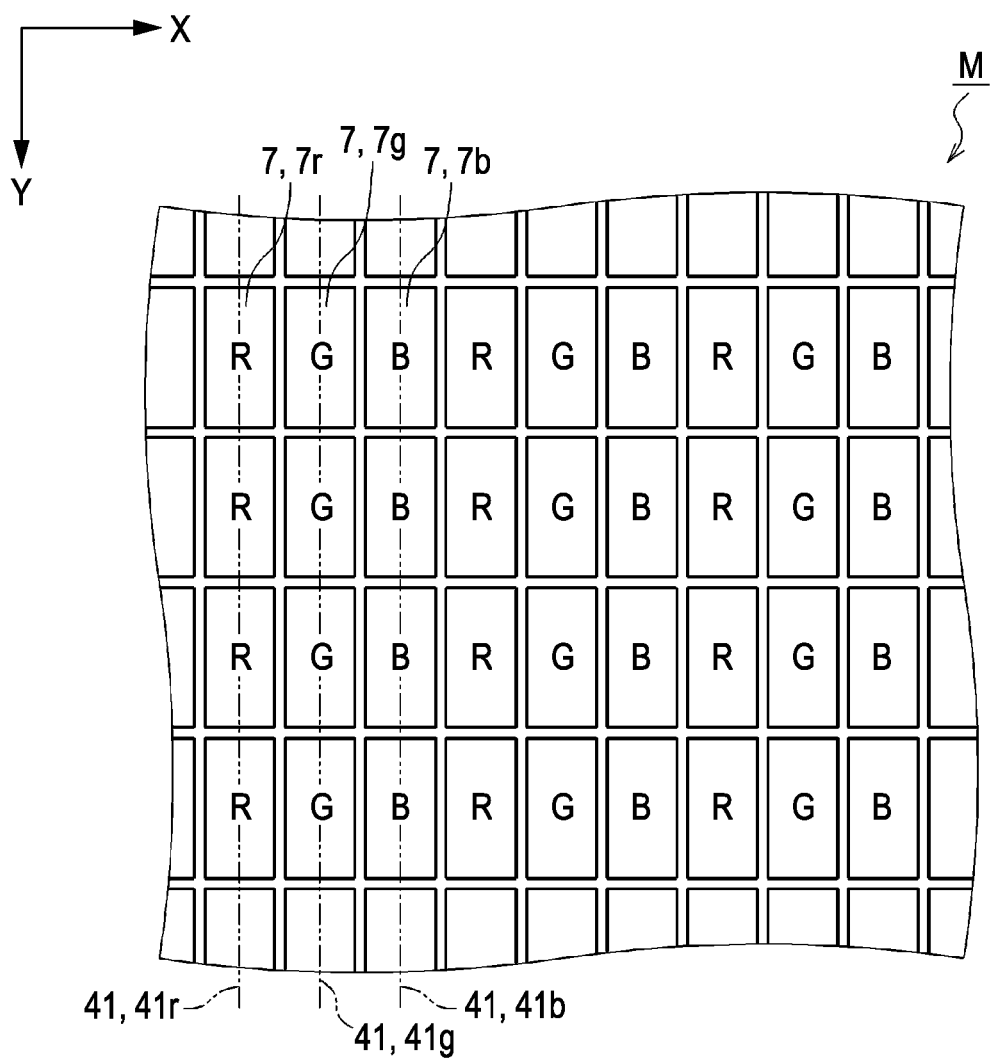
FIG. 3 is a plan view of part of a plurality of pixels of this embodiment.

The pixels 7 on the display panel 3 are each set such that the color of the light emitted from the display surface 9 is one of red (R), green (G), and blue (B), as shown in FIG. 3. In other words, the pixels 7 that constitute the matrix M include pixels 7r that emit R light, pixels 7g that emit G light, and pixels 7b that emit B light.

The R color is not limited to pure red tint but includes orange and so on. The G color is not limited to pure green tint but includes bluish green, yellowish green and so on. The B color is not limited to pure blue tint but includes bluish violet, bluish green and so on. From a different point of view, the R light can be defined as light whose peak of the wavelength is 570 nm or more in a visible light range, the G light can be defined as light whose peak of the wavelength ranges from 500 to 565 nm, and the B light can be defined as light whose peak of the wavelength ranges from 415 to 495 nm.

The matrix M is configured such that the pixels 7 arrayed along the Y-direction constitute one pixel column 41. The light of the pixels 7 in one pixel column 41 is set to one of R, G, and B. That is, the matrix M has a pixel column 41r in which the pixels 7r are arrayed in the Y-direction, a pixel column 41g in which the pixels 7g are arrayed in the Y-direction, and a pixel column 41b in which the pixels 7b are arrayed in the Y-direction. The matrix M is configured such that the pixel columns 41r, the pixel columns 41g, and the pixel columns 41b are arrayed repeatedly in that order along the X-direction.

Figure 4:
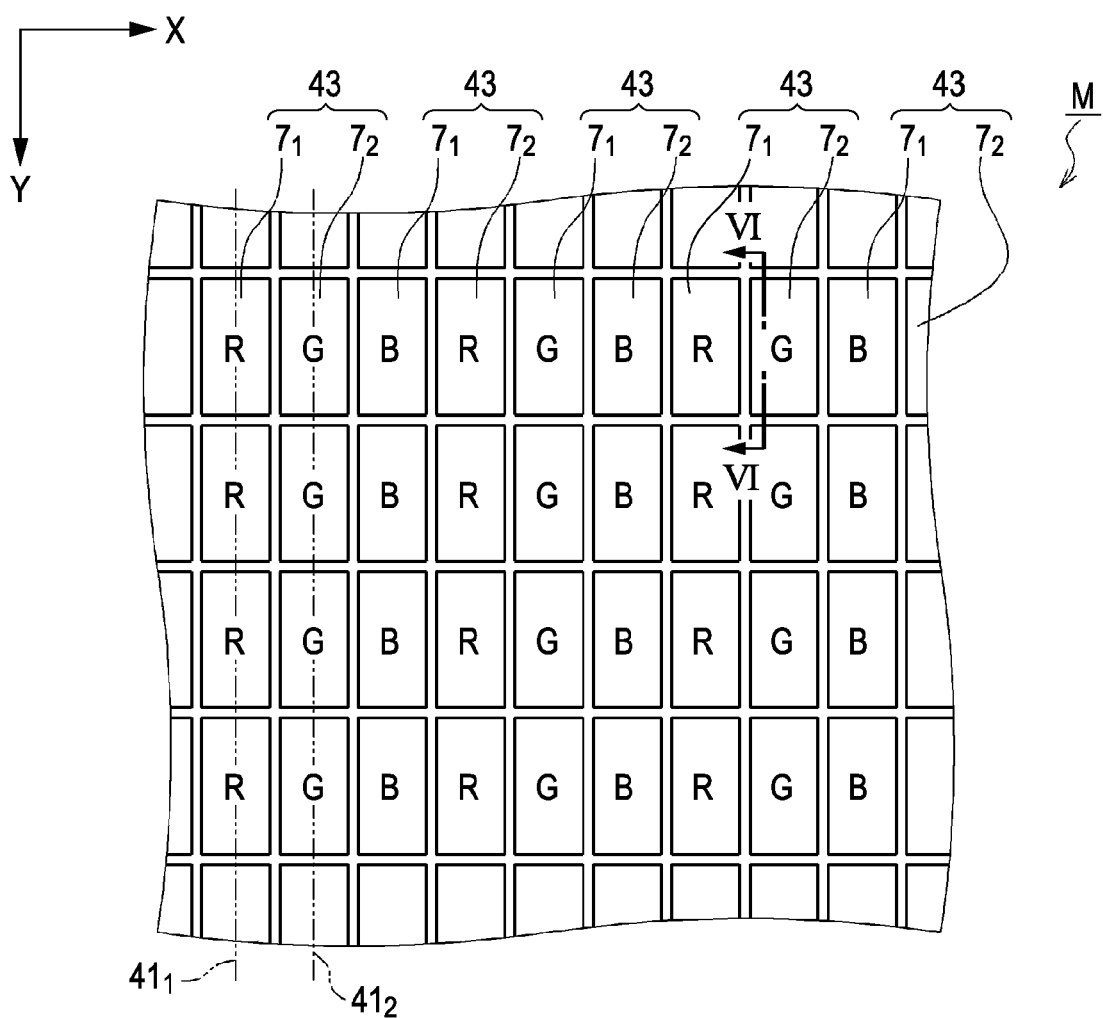
FIG. 4 is a plan view of part of the plurality of pixels of this embodiment.

In the display device 1, the pixels 7 that constitute the matrix M are divided into a plurality of first pixels $7_1$ and a plurality of second pixels $7_2$, as shown in FIG. 4. The display device 1 can display a first image on the display surface 9 by selectively emitting light incident on the display panel 3 from the illumination system 5 out of the display panel 3 via the first pixels $7_1$ and through the display surface 9. Furthermore, the display device 1 can display a second image on the display surface 9 by selectively emitting light incident on the display panel 3 from the illumination system 5 out of the display panel 3 via the second pixels $7_2$ and through the display surface 9.

The first image and the second image may either be different images or the same image. The word, pixel 7, the words, pixels 7r, 7g, and 7b, and the words, first and second pixels $7_1$ and $7_2$, are herein used as appropriate. To discriminate among R, G, and B for each of the first and second pixels $7_1$ and $7_2$, the words, first pixels $7r_1$, $7g_1$, and $7b_1$, and the words, second pixels $7r_2$, $7g_2$, and $7b_2$, are used, respectively.

The display device 1 is configured such that the first pixels $7_1$ and the second pixels $7_2$ are arrayed in the X-direction. One pixel column 41 is composed of the plurality of first pixels $7_1$ or the plurality of second pixels $7_2$. In other words, the matrix M includes a pixel column $41_1$ in which the first pixels 71 are arrayed along the Y-direction and a pixel column $41_2$ in which the second pixels $7_2$ are arrayed along the Y-direction. The word, pixel column 41, the words, pixel column 41r, pixel column 41g, pixel column 41b, the words, pixel column $41_1$ and pixel column $41_2$, are herein used as appropriate. To discriminate among R, G, and B for each of the pixel columns $41_1$ and $41_2$, the words, pixel columns $41r_1$, $41g_1$, and $41b_1$, and the words, pixel columns $41r_2$, $41g_2$, and $41b_2$, are used, respectively.

The display device 1 is configured such that the pixels 7 that constitute the matrix M are divided into a plurality of pixel groups 43 each include two pixels 7, the first pixels $7_1$ and the second pixels $7_2$ adjacent in the X-direction. The order of the first pixel $7_1$ and the second pixel $7_2$ in each of the pixel groups 43 is the same among the pixel groups 43. In this embodiment, the first pixels $7_1$ and the second pixels $7_2$ are arrayed from the left to the right in that order as viewed in FIG. 4. The order of the first pixel $7_1$ and the second pixel $7_2$ may be either from the left to the right or from the right to the left, provided that the order is the same among the pixel groups 43.

Figure 5:
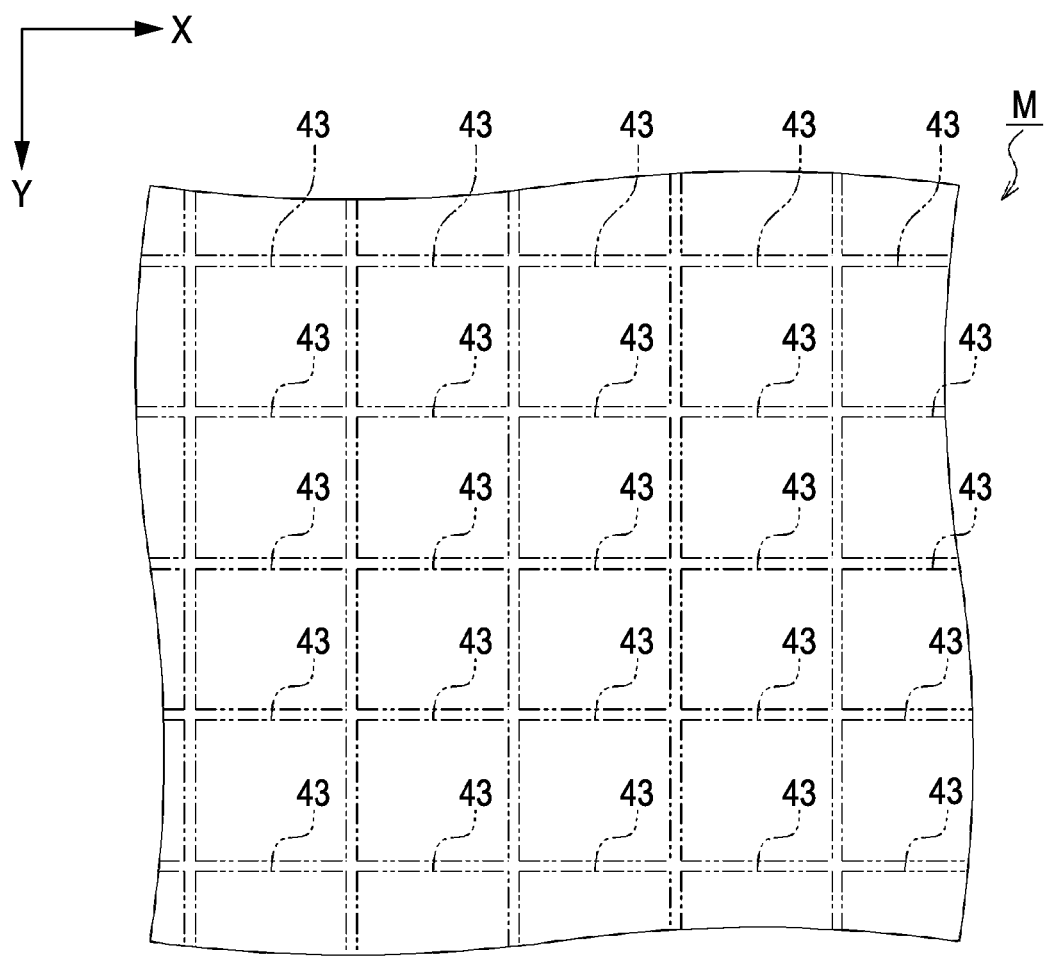
FIG. 5 is a plan view of the array of a plurality of pixel groups of this embodiment.

As shown in FIG. 5, the pixel groups 43 of the matrix M are arrayed along the X-direction and the Y-direction. In a word, the pixel groups 43 are arrayed in matrix form.

The structures of the driving-element substrate 15 and the counter substrate 17 of the liquid-crystal panel 11 and the filter substrate 14 will be described here in detail.

Figure 6:
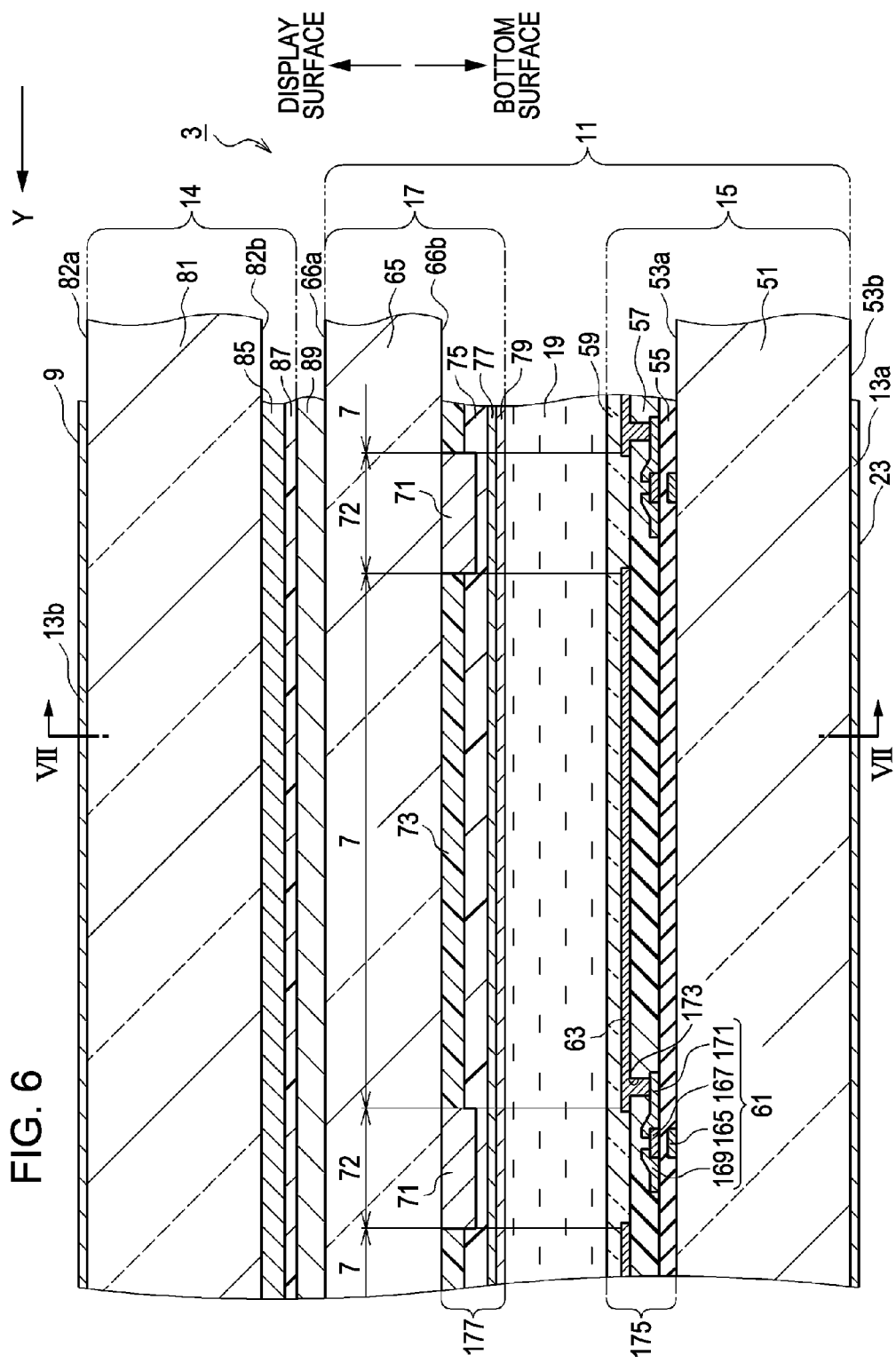
FIG. 6 is a cross-sectional view taken along line VI-VI in FIG. 4.

As shown in FIG. 6 which is a cross-section taken along line VI-VI in FIG. 4, the driving-element substrate 15 has a first substrate 51. The first substrate 51 is made of a light transmissive material such as glass, and has a first surface 53a opposed to the display surface 9 and a second surface 53b opposed to the bottom surface 23.

The first surface 53a of the first substrate 51 has a gate insulating layer 55. On the surface of the gate insulating layer 55 adjacent to the display surface 9 is provided an insulating layer 57. On the surface of the insulating layer 57 adjacent to the display surface 9 is provided an alignment film 59.

The driving-element substrate 15 has thin-film transistor (TFT) elements 61, which are switching elements, and pixel electrodes 63 each corresponding to each pixel 7 on the first surface 53a of the first substrate 51.

The TFT elements 61 each include a gate electrode 165, a semiconductor layer 167, a source electrode 169, and a drain electrode 171.

The gate electrode 165 is disposed on the first surface 53a of the first substrate 51, and is covered from the display surface 9 with the gate insulating layer 55. The material of the gate insulating layer 55 can be a light-transmissive material such as silicon oxide or silicon nitride.

The semiconductor layer 167 is made of amorphous silicon, for example, which is opposed to the gate electrode 165 with the gate insulating layer 55 therebetween. The semiconductor layer 167 includes a source region and a drain region (both are not shown).

The source electrode 169 is disposed on the surface of the gate insulating layer 55 adjacent to the display surface 9. Part of the source electrode 169 overlaps with the source region of the semiconductor layer 167.

The drain electrode 171 is disposed on the surface of the gate insulating layer 55 adjacent to the display surface 9. Part of the drain electrode 171 overlaps with the drain region of the semiconductor layer 167.

The TFT element 61 is covered from the display surface 9 with the insulating layer 57. The material of the insulating layer 57 can be a light-transmissive material such as silicon oxide, silicon nitride, or acrylic resin.

The pixel electrode 63 is made of a light-transmissive material such as an oxide conductive film made of indium tin oxide (ITO) or the like, or a light-transmissive metallic thin film made of magnesium or silver, and is disposed on the surface of the insulating layer 57 adjacent to the display surface 9. The pixel electrode 63 is connected to the drain electrode 171 through a contact hole 173 provided in the insulating layer 57.

The alignment film 59 is made of a light-transmissive material such as polyimide, which covers the insulating layer 57 and the pixel electrode 63 from the display surface 9. The alignment film 59 is subjected to orientation. The gate insulating layer 55, the insulating layer 57, the alignment film 59, the TFT element 61, and the pixel electrode 63 provided on the first substrate 51 are referred to as a driving element section 175.

The counter substrate 17 has a second substrate 65. The second substrate 65 is made of a light-transmissive material such as glass, and has an outward surface 66a adjacent to the display surface 9 and a counter surface 66b adjacent to the bottom surface 23.

The counter surface 66b of the second substrate 65 has a light-absorbing layer 71, which partitions the pixels 7, over an area 72. The pixels 7 of the display device 1 can each be defined as an area enclosed by the light-absorbing layer 71. The light-absorbing layer 71 is formed of a light-absorbing material, which has a lattice pattern in plan view.

The counter surface 66b of the second substrate 65 has color filters 73 which cover the regions enclosed by the light-absorbing layer 71, that is, the areas of the pixels 7, from the bottom surface 23. The color filters 73 allow light of incident light, with a predetermined wavelength, to pass therethrough. The color filters 73 are made of resin which is colored in different colors among the pixels 7r, 7g, and 7b. The color filter 73 corresponding to the pixels 7r allows R light to pass therethrough. The color filter 73 corresponding to the pixels 7g allows G light to pass therethrough. The color filter 73 corresponding to the pixels 7b allows B light to pass therethrough. To discriminate among R, G, and B of the color filters 73, the words, color filters 73r, 73g, and 73b, are used.

An overcoating layer 75 is disposed on the surfaces of the light-absorbing layer 71 and the color filters 73 adjacent to the bottom surface 23. The overcoating layer 75 is made of light-transmissive resin or the like, which covers the light-absorbing layer 71 and the color filters 73 from the bottom surface 23.

A counter electrode 77 is provided on the surface of the overcoating layer 75 adjacent to the bottom surface 23. The counter electrode 77 is made of a light-transmissive material such as an oxide conductive film made of indium tin oxide or the like or a light transmissive metal thin film made of magnesium or silver. The counter electrode 77 is provided on an area overlapping with the pixels 7 that constitute the matrix M in plan view. The counter electrode 77 is connected to a common line (not shown).

On the surface of the counter electrode 77 adjacent to the bottom surface 23 is provided an alignment film 79. The alignment film 79 is made of a light-transmissive material such as polyimide, which covers the counter electrode 77 from the bottom surface 23. The alignment film 79 is subjected to orientation. The light-absorbing layer 71, the color filters 73, the overcoating layer 75, the counter electrode 77, and the alignment film 79 which are provided on the second substrate 65 are referred to as a counter element section 177.

The TFT element 61 described above is provided in the area 72 on the left in FIG. 6, in which the drain electrode 171 extends from the area 72 into the area of the pixel 7. The gate electrodes 165 of the pixels 7 adjacent in the X-direction are connected by a gate line (not shown). The source electrodes 169 of the pixels 7 adjacent in the Y-direction are connected by a data line (not shown).

The liquid crystal 19 between the driving-element substrate 15 and the counter substrate 17 is sandwiched between the alignment film 59 and the alignment film 79. In the display device 1, the sealing member 25 shown in FIG. 2 is sandwiched between the first surface 53a of the first substrate 51 and the counter surface 66b of the second substrate 65 shown in FIG. 6. In other words, the liquid crystal 19 in the display device 1 is held by the first substrate 51 and the second substrate 65. The sealing member 25 may be disposed between the alignment film 59 and the alignment film 79. In this case, the liquid crystal 19 is regarded as being held by the driving-element substrate 15 and the counter substrate 17.

The filter substrate 14 has a third substrate 81. The third substrate 81 is made of a light-transmissive material such as glass, and has an outward surface 82a opposed to the display surface 9 and a counter surface 82b opposed to the bottom surface 23.

The counter surface 82b of the third substrate 81 has light-shielding films 85. The light-shielding films 85 can be formed of, for example, resin that contains carbon black or a high-light-absorbing material such as chromium. The light-shielding films 85 are disposed across the pixels 7 arrayed in the Y-direction.

The surface of the light-shielding films 85 adjacent to the bottom surface 23 are provided with an overcoating layer 87. The overcoating layer 87 is made of a light-transmissive material such as acrylic resin, which covers the light-shielding films 85 from the bottom surface 23.

This filter substrate 14 is constructed such that the overcoating layer 87 is bonded to the outward surface 66a with a light-transmissive adhesive, with the counter surface 82b opposed to the outward surface 66a of the second substrate 65.

Figure 7:
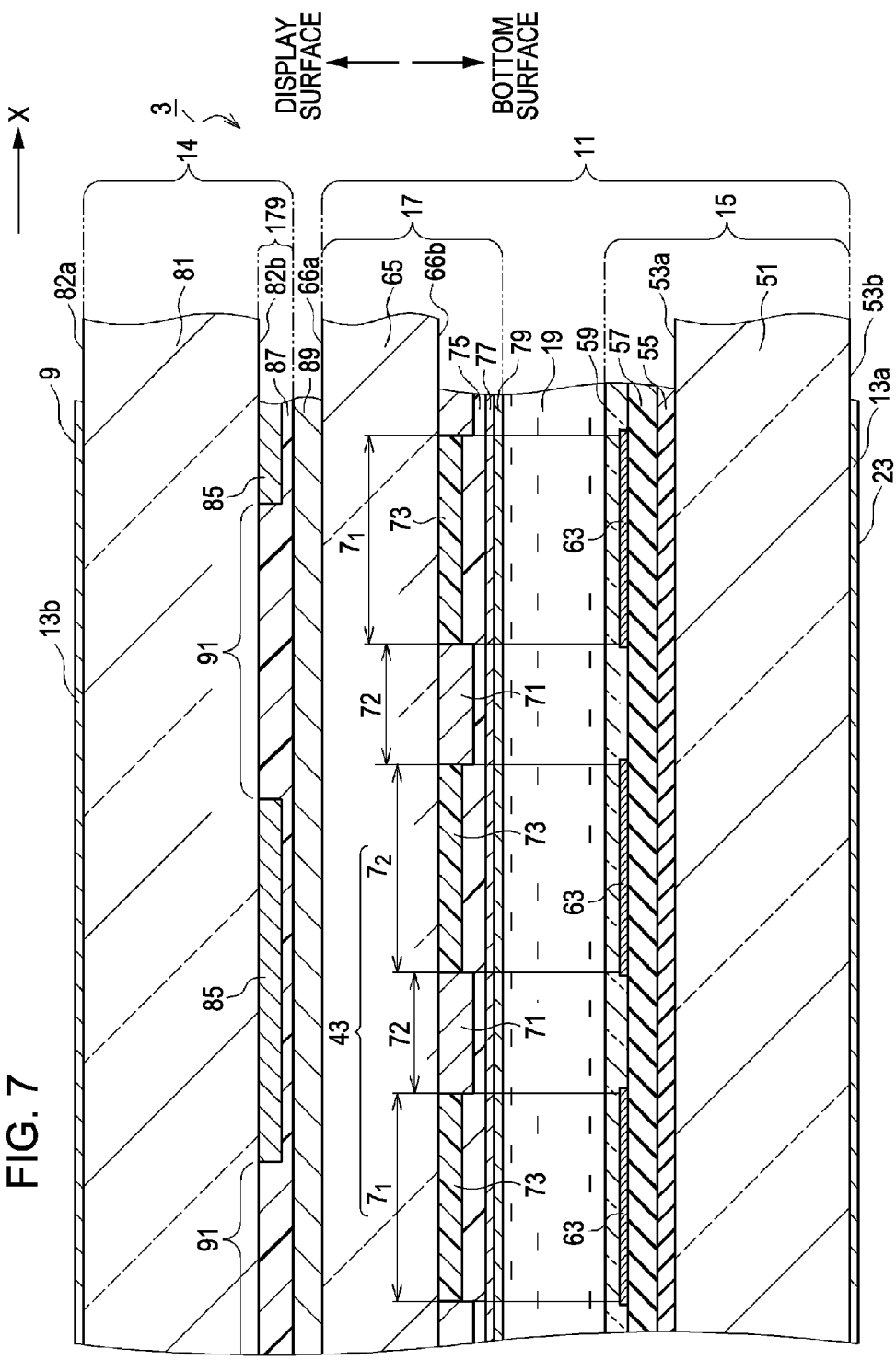
FIG. 7 is a cross-sectional view taken along line VII-VII in FIG. 6.

The light-shielding film 85 is provided for each of the pixel groups 43, as shown in FIG. 7 which is a cross-section taken along line VII-VII of FIG. 6. In other words, the filter substrate 14 includes the plurality of light-shielding films 85. The light-shielding films 85 are each disposed in the area straddling the first pixel $7_1$ and the second pixel $7_2$ that constitute each of the pixel groups 43.

Figure 8:
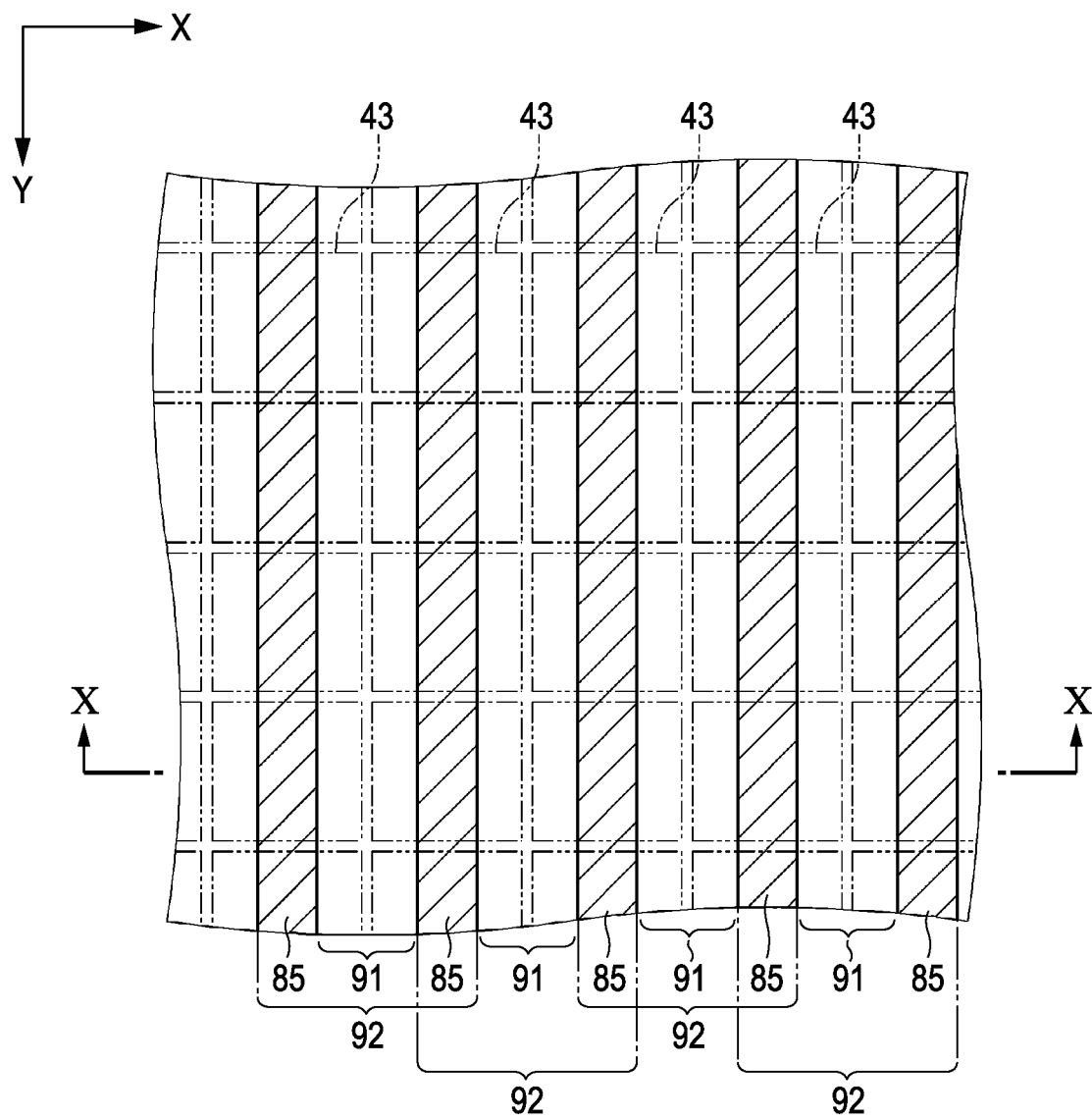
FIG. 8 is a plan view of light-shielding films and pixel groups of this embodiment.

The light-shielding films 85 are provided across the pixel groups 43 arrayed in the Y-direction, as shown in FIG. 8 which is a plan view of the light-shielding films 85 and the pixel groups 43. In other words, one light-shielding film 85 corresponds to the plurality of pixel groups 43 arrayed in the Y-direction. In FIG. 8, the light-shielding films 85 are hatched for illustrative purpose.

There is an opening 91 between the light-shielding films 85 adjacent in the X-direction. In other words, the light-shielding films 85, which are disposed across the pixels 7 of the matrix M, have the openings 91 between the pixel groups 43 adjacent in the X-direction.

One opening 91 and two light-shielding films 85 adjacent in the X-direction, with the opening 91 therebetween, constitute a filter 92.

As shown in FIG. 7, the overcoating layer 87 extends into the opening 91. That is to say, the overcoating layer 87 covers the light-shielding films 85 and the counter surface 82b of the third substrate 81 from the bottom surface 23. The light-shielding films 85 and the overcoating layer 87 disposed on the third substrate 81 are referred to as a filter section 179.

As shown in FIG. 7, the counter electrode 77 extends across the plurality of pixels 7, and functions in common to the pixels 7. The periphery of each pixel electrode 63 extends into the area 72 in plan view.

This display device 1 controls display by changing the orientation of the liquid crystal 19 of each pixel 7, with the display panel 3 irradiated with light from the illumination system 5. The orientation of the liquid crystal 19 can be changed by turning OFF and OFF the TFT elements 61.

FIG. 9A shows polarization when the TFT element 61 is in OFF state. FIG. 9B shows polarization when the TFT element 61 is in ON state.

As shown in FIGS. 9A and 9B, the light transmission axis 93 of the polarizer 13a of the display device 1 intersects at right angles to the light transmission axis 95 of the polarizer 13b. The orientation 97 of the alignment film 59 intersects at right angles to the light transmission axis 95. The orientation 99 of the alignment film 79 is parallel to the light transmission axis 95.

Referring to FIGS. 9A and 9B, the X'-direction indicates the direction along the light transmission axis 95 of the polarizer 13b in plan view, and the Y'-direction indicates the direction orthogonal to the X'-direction in the XY-plane. The X'-direction and the Y'-direction are any two directions intersecting at right angles in the XY-plane.

The light incident on the polarizer 13a from the polarizer 13a enters the liquid crystal 19 as linearly polarized light 103 having a polarizing axis along the light transmission axis 93 of the polarizer 13a, that is, the Y'-direction. As shown in FIG. 9A, when the TFT element 61 is in OFF state, the linearly polarized light 103 incident on the liquid crystal 19 is emitted as linearly polarized light 105 having a polarizing axis along the X'-direction by the optical activity of the liquid crystal 19. The linearly polarized light 105 emitted toward the polarizer 13b passes through the polarizer 13b because the direction of the polarizing axis is parallel to the light transmission axis 95 of the polarizer 13b.

On the other hand, as shown in FIG. 9B, when the TFT element 61 is in ON state, the linearly polarized light 103 is emitted as the linearly polarized light 103 toward the polarizer 13b while the polarized state is maintained. The linearly polarized light 103 emitted toward the polarizer 13b is absorbed by the polarizer 13b because the polarizing axis intersects at right angles to the light transmission axis 95 of the polarizer 13b.

The display device 1 adopts what is called a normally white display mode in which when the TFT element 61 is in OFF state, light is emitted from the display surface 9, and when the TFT element 61 is in ON state, the emission of light from the display surface 9 is stopped. However, the display mode may not be limited to the normally white mode but may be a normally black mode.

As described above, the display device 1 includes the plurality of light-shielding films 85. Between the light-shielding films 85 adjacent in the X-direction is provided the opening 91. The light incident on the pixels 7 from the illumination system 5 is emitted toward the display surface 9 through the openings 91.

As shown in FIG. 10 which is a schematic cross-section of the pixel groups 43 and the light-shielding films 85, lights 107a emitted from the first pixels $7r_1$, $7g_1$, and $7b_1$ toward the display surface 9 reach a first range 109 through the openings 91.

Lights 107b emitted from the second pixels $7r_2$, $7g_2$, and $7b_2$ toward the display surface 9 reach a second range 111 through the openings 91. The cross-section shown in FIG. 10 corresponds to the cross-section taken along line X-X in FIG. 8.

From the first range 109, the lights 107a from the first pixels $7_1$ can be viewed through the openings 91. From the second range 111, the lights 107b from the second pixels $7_2$ can be viewed through the openings 91. When an eye point is within the first range 109, the first image formed by the lights 107a from the first pixels $7_1$ can be viewed. When an eye point is within the second range 111, the second image formed by the lights 107b from the second pixels $7_2$ can be viewed. In other words, in this display device 1, the filters 92 shown in FIG. 8 have the function of allowing the lights 107a emitted from the first pixels $7_1$ to the first range 109 to pass through, and the lights 107b emitted from the second pixels $7_2$ to the second range 111 to pass through. Thus, what is called directional display can be performed in which the first image is displayed in the first range 109 and the second image is displayed in the second range 111 different from the first range 109.

The first range 109 and the second range 111 have an overlapping range 113. From this range 113, the first image and the second image are viewed in a superimposed state. From a range 115a (hereinafter, referred to as a preferred viewing range 115a) of the first range 109 except the range 113, only the first image can be viewed. From a range 115b (hereinafter, referred to as a preferred viewing range 115b) of the second range 111 except the range 113, only the second image can be viewed.

The display device 1 is configured such that the lights 107a emitted from the first pixels $7_1$ intersect at both ends of the first range 109, and the lights 107b emitted from the second pixels $7_2$ intersect at both ends of the second range 111. This can be achieved by setting the interval Pa between the light-shielding films 85 adjacent in the X-direction shorter than the interval Pb between the pixel groups 43 adjacent in the X-direction.

Thus, the amounts of lights viewed from any point in the preferred viewing range 115a can be made equal among the first pixels $7_1$. Likewise, the amounts of lights viewed from any point in the preferred viewing range 115b can be made equal among the second pixels $7_2$.

A method for manufacturing the display device 1 will be described hereinbelow.

The method for manufacturing the display device 1 is roughly divided into a method for manufacturing the substrates, a method for manufacturing the liquid-crystal panel 11, a method for manufacturing the display panel 3, and a method for manufacturing the display device 1.

First, the method for manufacturing the substrates will be described.

The method for manufacturing the substrates is divided into a method for manufacturing the driving-element substrate 15, a method for manufacturing the counter substrate 17, and a method for manufacturing the filter substrate 14.

As shown in FIG. 11A, by the method for manufacturing the driving-element substrate 15, a plurality of the driving element sections 175 corresponding to the number of the liquid-crystal panels 11 is formed on one mother substrate 51m. The driving element sections 175 are each provided for a portion 121 corresponding to one liquid-crystal panel 11. As shown in FIG. 11B, by the method for manufacturing the counter substrate 17, a plurality of the counter element sections 177 corresponding to the number of liquid-crystal panels 11 is formed on one mother substrate 65m. The counter element sections 177 are each provided for the portion 121 corresponding to one liquid-crystal panel 11.

Figure 12A:
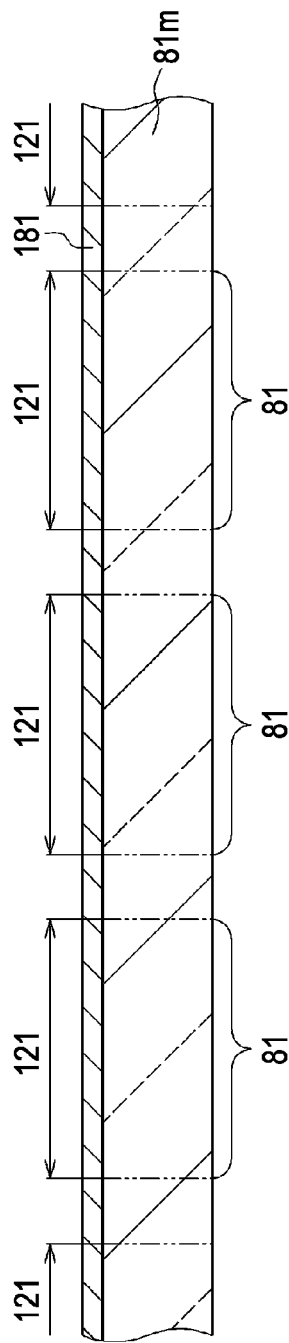
FIG. 12A is a diagram illustrating a method for manufacturing a filter substrate according to the embodiment.

As shown in FIG. 12A, by the method for manufacturing the filter substrate 14, a light-shielding film 181 is formed across an area corresponding to a plurality of the liquid-crystal panels 11 on one mother substrate 81m.

Next, the light-shielding film 181 is patterned into the light-shielding films 85, shown in FIG. 7, for each portion 121 corresponding to one liquid-crystal panel 11.

Figure 12B:
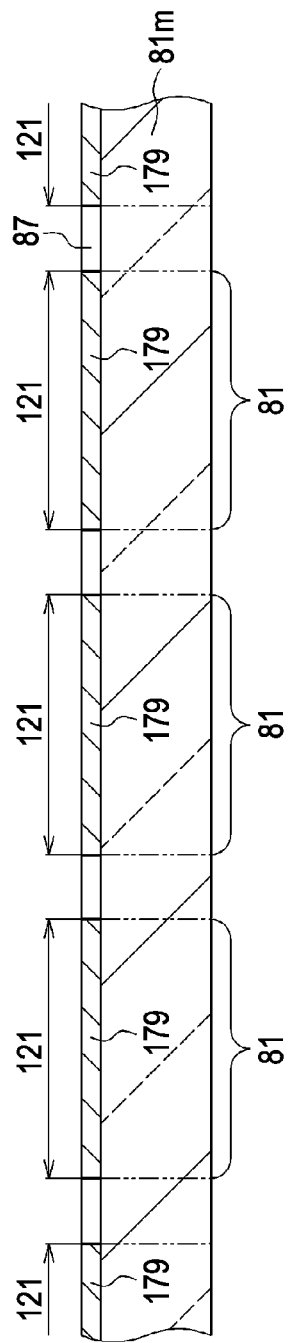
FIG. 12B is a diagram illustrating the method for manufacturing the filter substrate according to the embodiment.

Next, the light-shielding films 85 formed on the portions 121 are covered with the overcoating layer 87. Thus, the filter sections 179 are formed on the portions 121, as shown in FIG. 12B.

Figure 12C:
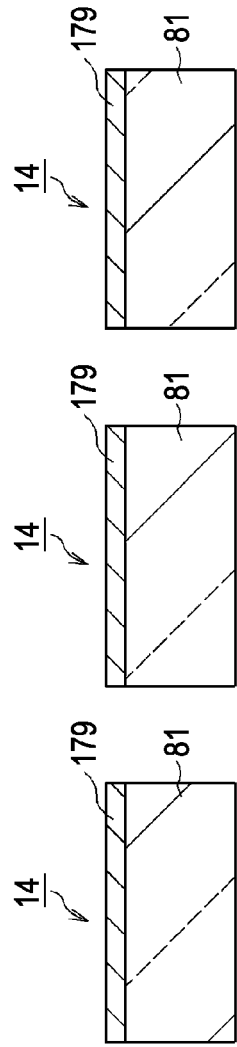
FIG. 12C is a diagram illustrating the method for manufacturing the filter substrate according to the embodiment.

Next, the mother substrate 81m on which the filter sections 179 are formed is cut by the portion 121 to manufacture the plurality of filter substrates 14 as shown in FIG. 12C.

By the method for manufacturing the liquid-crystal panel 11, as shown in FIG. 13A, the mother substrate 51m on which the driving element sections 175 are formed and the mother substrates 65m on which the counter element sections 177 are formed are bonded together, with the ring-shaped sealing member 25 provided for each portion 121 therebetween. The sealing member 25 for each portion 121 is provided such that part of the ring-shaped outline is cut off in plan view. The notch of the ring-shaped outline of the sealing member 25 serves as an inlet for the liquid crystal 19.

Subsequently, a surface 178a of the mother substrate 65m is subjected to etching or chemical mechanical polishing (CMP) so that the mother substrate 65m is decreased in thickness as shown in FIG. 13B. The surface 178a of the mother substrate 65m subjected to etching or CMP is formed into the outward surface 66a.

The liquid crystal 19 is injected for each portion 121 through the inlet, and thereafter the inlet is closed to seal the liquid crystal 19.

Figure 14:
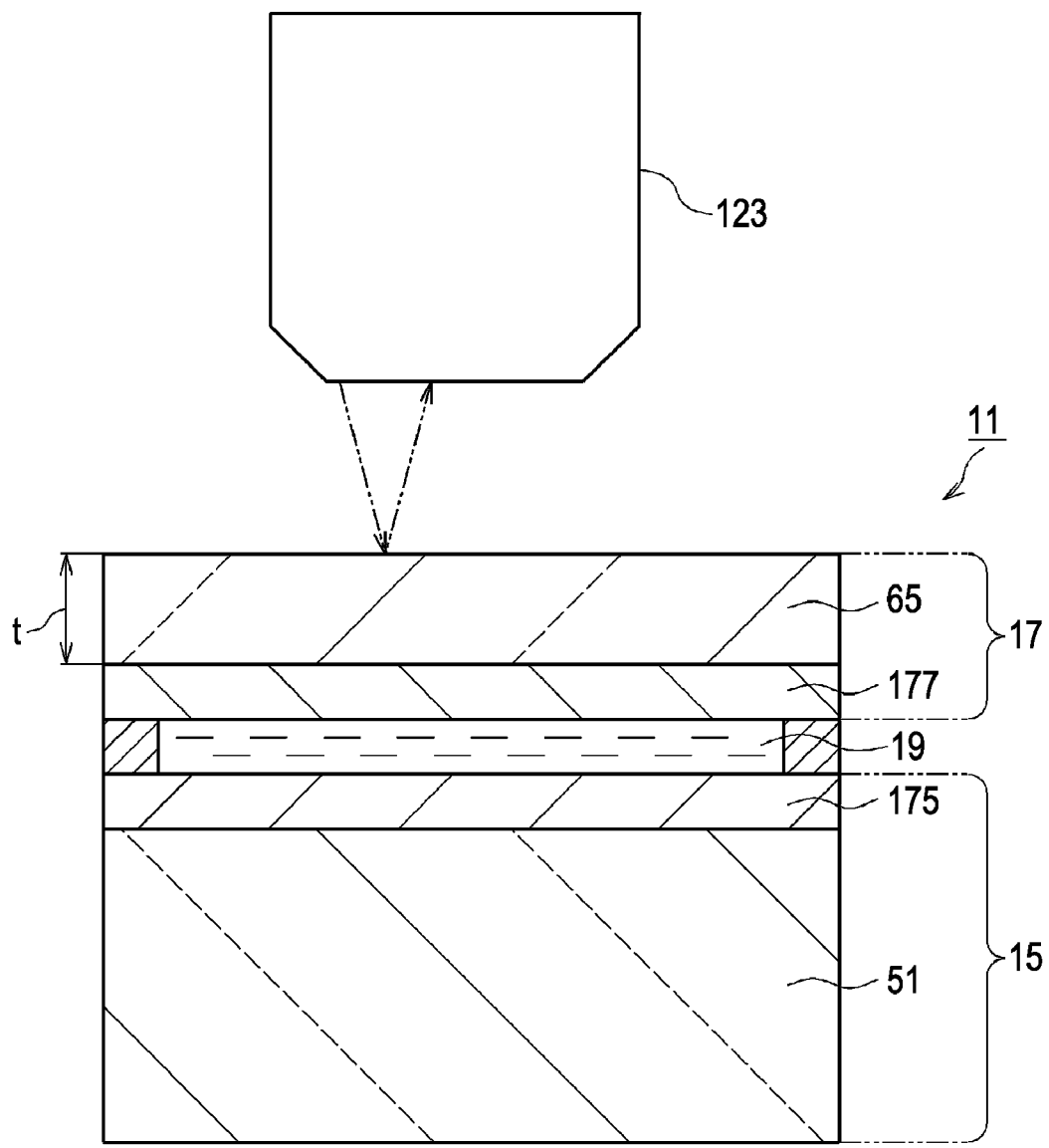
FIG. 14 is a diagram illustrating a method for manufacturing a display panel according to the embodiment.

Next, the portions 121 are cut to manufacture the liquid-crystal panel 11 shown in FIG. 14.

As shown in FIG. 14, by the method for manufacturing the display panel 3, first, the thickness t of the second substrate 65 of the liquid-crystal panel 11 is measured by, for example, a laser displacement laser 123.

Figure 15:
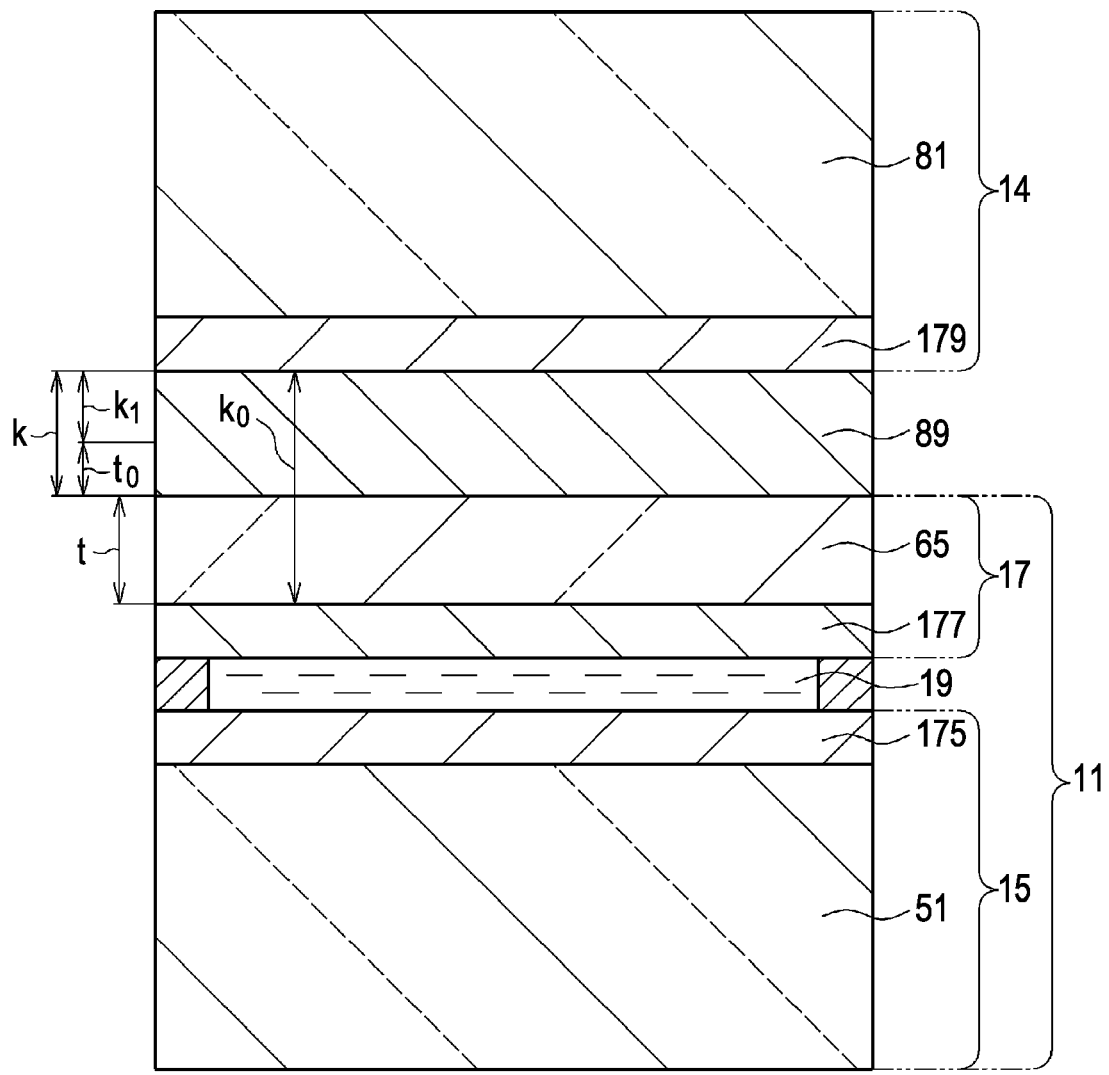
FIG. 15 is a diagram illustrating the method for manufacturing the display panel according to the embodiment.

Next, as shown in FIG. 15, the filter substrate 14 and the counter substrate 17 are bonded together with an adhesive 89. The interval between the filter section 179 and the second substrate 65 is held at a distance k corresponding to the thickness t of the second substrate 65.

The distance k is set according to the difference between the thickness t and a reference value so that the distance $k_0$ between the counter element section 177 and the filter section 179 becomes within a permissible range. If the thickness t is equal to the reference value, the distance k is set to a reference distance $k_1$. For example, if the thickness t is smaller than the reference value by $t_0$, the distance k is set to the sum of the reference distance $k_1$ and the difference to between the thickness t and the reference value.

In the display device 1, the distance between the filter section 179 and the second substrate 65 is kept at the distance k according to the amount of the adhesive 89. This can be achieved by applying the adhesive 89 with a dispenser and controlling the ejecting pressure of the adhesive 89. Setting the ejecting pressure hither than a reference pressure can make the amount of application of the adhesive 89 higher than a reference amount.

After the filter substrate 14 is formed on the liquid-crystal panel 11, the polarizer 13a is formed on the first substrate 51, and the polarizer 13b is formed on the third substrate 81, so that the display panel 3 shown in FIG. 7 is manufactured.

By the method for manufacturing the display device 1, the display panel 3 and the illumination system 5 are combined into the display device 1.

In the display device 1, the filter 92 corresponds to the filter serving as an optical element, the second substrate 65 corresponds to the substrate, and the driving-element substrate 15 corresponds to the second substrate.

The method for manufacturing the display device 1 includes a step of providing the filter substrate 14 on the second substrate 65 while keeping the distance between the second substrate 65 and the filter section 179 at the distance k that is set according to the thickness t of the second substrate 65. This manufacturing method allows the distance between the second substrate 65 and the filter section 179 to be kept at the distance k that is set according to the thickness t of the second substrate 65. This facilitates equalizing the distances between the plurality of pixels 7 and the filter 92 even if the thickness of the second substrate 65 is different among a plurality of the display devices 1. This facilitates decreasing variations of the preferred viewing range 115a and the preferred viewing range 115b among the plurality of display devices 1.

The method for manufacturing the display device 1 further includes a step of decreasing the thickness of the second substrate 65 in the state of the mother substrate 65m before the step of providing the filter substrate 14 on the second substrate 65. The decrease in the thickness of the second substrate 65 can decrease the distance between the pixels 7 and the filter 92. This enlarges the preferred viewing range 115a and the preferred viewing range 115b of the display device 1.

In the display device 1, in the method of decreasing the thickness of the second substrate 65 in the state of the mother substrate 65m, the mother substrate 65m is decreased in thickness, with the mother substrate 65m and the mother substrate 51m joined together. A decrease in the thickness of a substrate generally decreases its strength, thus making it difficult to handle the thinned substrate. However, in the case of the display device 1, the mother substrate 65m is decreased in thickness, with the mother substrate 65m and the mother substrate 51m joined together, so that the mother substrate 65m is reinforced by the mother substrate 51m. This facilitates handling of the thinned mother substrate 65m.

The method for manufacturing the display device 1 further includes a step of measuring the thickness t of the second substrate 65 before the step of providing the filter substrate 14 on the second substrate 65. This allows the distance k between the second substrate 65 and the filter 92 to be set according to the measurement of the thickness t.

In the step of providing the filter substrate 14 on the second substrate 65, the distance k is kept according to the amount of the adhesive 89. This allows the second substrate 65 and the filter substrate 14 to be joined while keeping the distance k.

While the method for manufacturing the display device 1 has been described using the example in which the distance k is controlled according to the amount of the adhesive 89, the method for controlling the distance k is not limited to that. The distance k may be controlled using a spacer layer 125 placed between the second substrate 65 and the filter 92.

Figure 16:
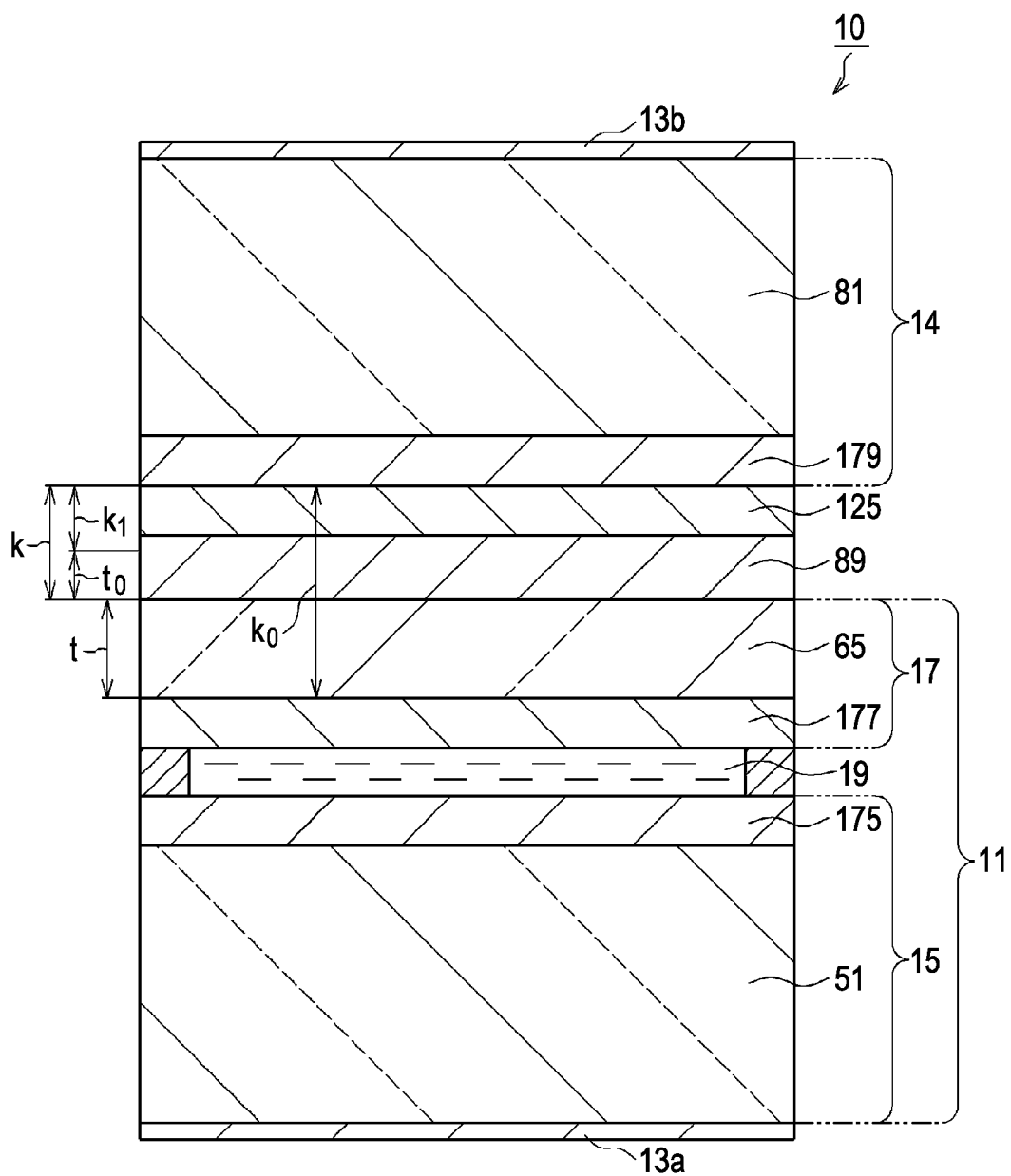
FIG. 16 is a diagram illustrating a method for manufacturing a display panel according to another embodiment.

In this case, as shown in FIG. 16, the spacer layer 125 is disposed between the filter section 179 and the adhesive 89.

The spacer layer 125 can be made of a light-transmissive inorganic material such as silicon oxide or silicon nitride or a light-transmissive organic material such as acryl or epoxy.

With the inorganic material such as silicon oxide or silicon nitride, the spacer layer 125 can be formed by vapor deposition. With the organic material such as acryl or epoxy, the spacer layer 125 can be formed by applying the liquid organic material by spin coating or the like and then solidifying it. Alternatively, the spacer layer 125 can be formed by bonding an organic sheet material.

The display panel 10 incorporating the spacer layer 125 is such that the distance between the filter section 179 and the second substrate 65 is kept at the distance k according to the thickness t of the second substrate 65. When the thickness of the spacer layer 125 is set to the difference $t_0$ between the thickness t of the second substrate 65 and the reference value, the distance k can be kept without changing the amount of the adhesive 89 among the plurality of display panels 10.

In other words, in the case of the display panel 10, the distance k is controlled by the spacer layer 125. This facilitates keeping the distance k between the second substrate 65 and the filter section 179.

Moreover, the distance k can be kept without changing the amount of the adhesive 89 among the plurality of display panels 10. This omits the control of a device for applying the adhesive 89, such as a dispenser. This prevents variations in the amount of the adhesive 89 due to the control of the device, further decreasing variations in the preferred viewing range 115a and the preferred viewing range 115b among the plurality of display devices 1. Moreover, this omits the control of the device for applying the adhesive 89, increasing the efficiency of the manufacturing process.

Since the filter section 179 of this display panel 10 is covered with the spacer layer 125, the filter section 179 can be protected by the spacer layer 125, so that the filter substrate 14 can easily be handled. This further increases the efficiency of the manufacturing process.

It is preferable for the display panel 10 incorporating the spacer layer 125 that the plurality of liquid-crystal panels 11 be layered according to the measurement of the thickness t of the second substrate 65. This is because the thicknesses of the spacer layers 125 can be equalized. For example, assume that the difference $t_0$ (a negative value) between the thickness t of the second substrate 65 and the reference value is divided into three sections from a first section to a third section. The first section is set such that the difference $t_0$ is larger than $t_1$ and smaller than 0. The second section is set such that the difference $t_0$ is larger than $t_2$ and smaller than or equal to $t_1$. The third section is set such that the difference $t_0$ is larger than $t_3$ and smaller than or equal to $t_2$. The values $t_1$, $t_2$, and $t_3$ satisfy Eq. (1).

$$t_3 < t_2 < t_1 < 0 \qquad \text{Eq. (1)}$$

For the liquid-crystal panel 11 layered as the first section, the spacer layer 125 with a thickness $t_{s1}$ calculated by Eq. (2), for example, is applied.

$$t_{s1} = (0 - t_1)/2 \qquad \text{Eq. (2)}$$

Likewise, for the liquid-crystal panel 11 layered as the second section, the spacer layer 125 with a thickness $t_{s2}$ calculated by Eq. (3) is applied, and for the liquid-crystal panel 11 layered as the third section, the spacer layer 125 with a thickness $t_{s3}$ calculated by Eq. (4) is applied.

$$t_{s2} = (t_1 - t_2)/2 \qquad \text{Eq. (3)}$$

$$t_{s3} = (t_2 - t_3)/2 \qquad \text{Eq. (4)}$$

When the difference $t_0$ is 0, the spacer layer 125 is not applied.

In the case of the display panel 10 whose liquid-crystal panel 11 is layered into a plurality of sections and which incorporates the spacer layer 125 whose thickness is varied from section to section, the filter substrates 14 are divided into groups corresponding to the number of divisions of the liquid-crystal panel 11. The spacer layers 125 whose thickness is varied from group to group are provided to the filter substrates 14. Thus, the thicknesses of the spacer layers 125 applied to the filter substrates 14 of one group are equalized. As a result, the spacer layers 125 are standardized, so that the efficiency of the manufacture of the display panel 10 is further increased.

The spacer layer 125 of this display panel 10 is disposed on the filter substrate 14, while the spacer layer 125 may be provided on the liquid-crystal panel 11.

Figure 17:
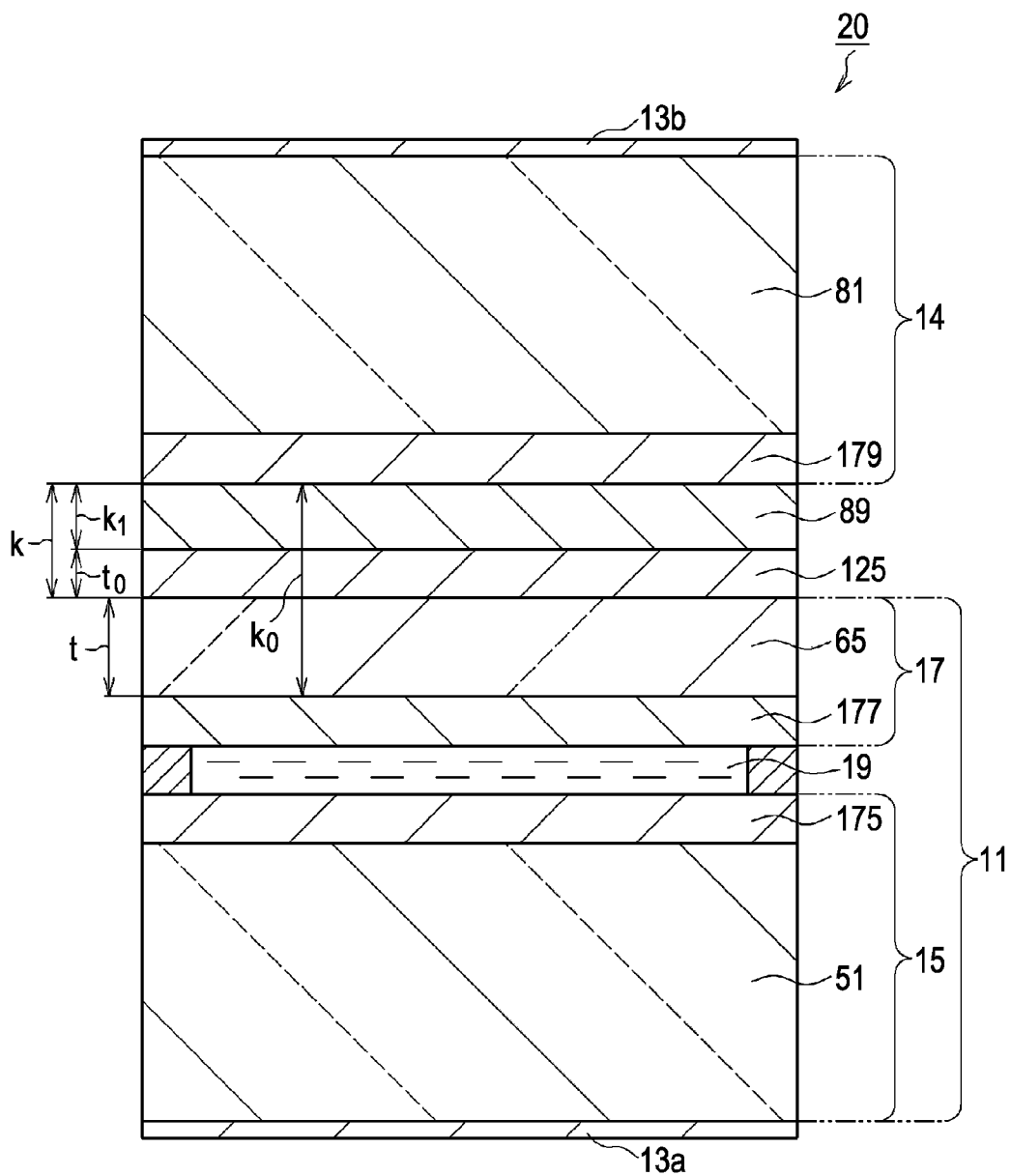
FIG. 17 is a diagram illustrating a method for manufacturing a display panel according to another embodiment.

In this case, the spacer layer 125 can be disposed on the second substrate 65 of the counter substrate 17, as shown in FIG. 17.

In the case of a display panel 20 in which the spacer layer 125 is disposed on the second substrate 65, the second substrate 65 is reinforced by the spacer layer 125. Accordingly, providing the spacer layer 125 on the mother substrate 65m when the second substrate 65 is in the state of the mother substrate 65m facilitates handling of the thinned mother substrate 65m.

If the spacer layer 125 is formed on each second substrate 65 after the plurality of liquid-crystal panels 11 is divided into layers by the thickness t of the second substrate 65, the spacer layers 125 with the same thickness can be provided for each division of the thickness t. This allows the spacer layer 125 with an appropriate thickness to be formed on each second substrate 65 even if the thickness t of the second substrates 65 varies. The display panel 20 can be provided with the spacer layers 125 on the plurality of second substrates 65 for each division of the thickness t of the second substrate 65, so that the efficiency of the manufacturing process can be improved.

In the case where the spacer layer 125 is formed by bonding an organic sheet material to the filter substrate 14 or the mother substrate 65m, or the second substrate 65, there may be the following method to bond the sheet material.

Figure 18A:
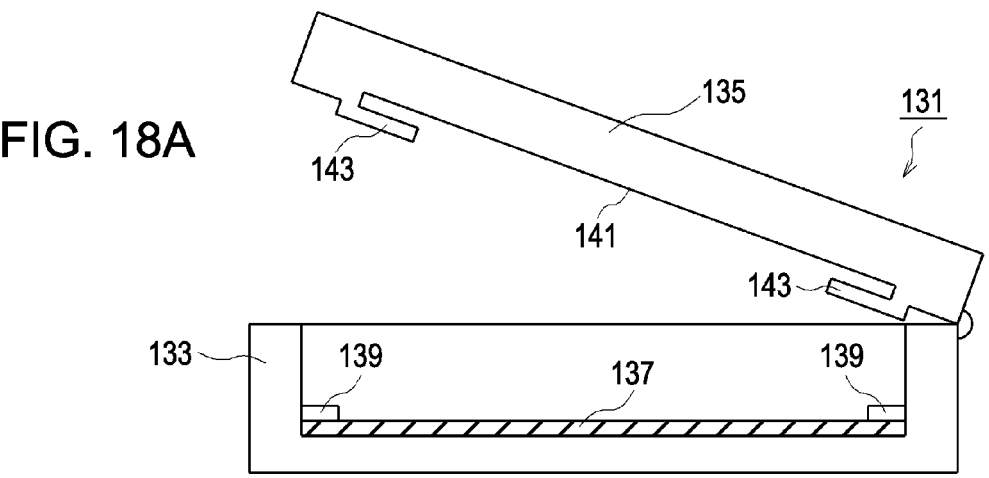
FIG. 18A is a diagram illustrating a method for bonding a sheet material to be applied to the display device according to the embodiment.

A bonding system 131 shown in FIG. 18A can be used for bonding the sheet material in this embodiment.

The bonding system 131 includes a container 133 and a lid 135. The container 133 has a mount 137 therein. The mount 137 is made of an elastic material such as rubber or elastomer, whose periphery is fixed by a fixing section 139. The lid 135 is rotatably about the container 133 with a hinge. The lid 135 has claws 143 on a surface 141 adjacent to the container 133, with a space therebetween.

Figure 18B:
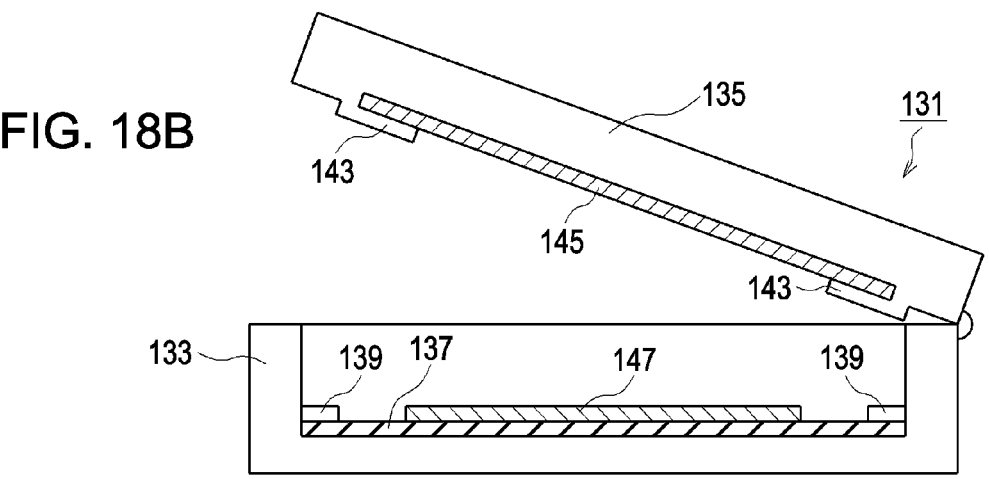
FIG. 18B is a diagram illustrating the method for bonding the sheet member to be applied to the display device according to the embodiment.

To bond a sheet material 145, first, the sheet material 145 is inserted between the claws 143 and the surface 141 (see FIG. 18A), as shown in FIG. 18B. Thus the sheet material 145 is mounted to the lid 135.

Next, among the filter substrate 14, the mother substrate 65m, and the second substrate 65, an object substrate 147 to which the sheet material 145 is to be bonded is placed on the mount 137. Next, the lid 135 is rotated to seal the container 133. The container 133 has an outlet (not shown) passing between the inside and outside of the container 133, and an inlet (not shown) passing between the inner bottom and outer bottom of the container 133. The inlet is closed from the interior of the container 133 by the mount 137.

Figure 18C:
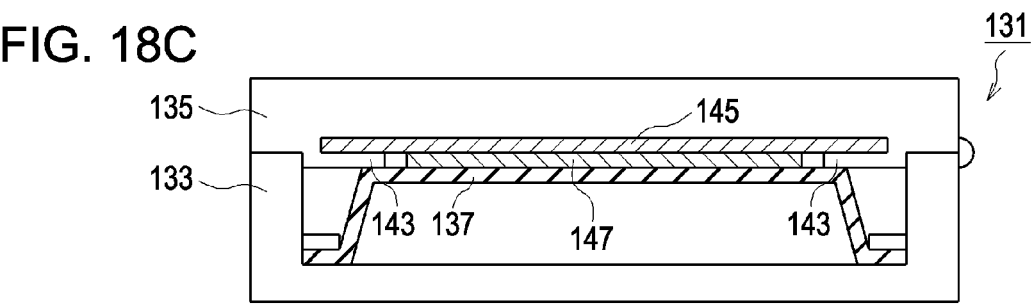
FIG. 18C is a diagram illustrating the method for bonding the sheet member to be applied to the display device according to the embodiment.

Next, the interior of the container 133 is decreased in pressure by discharging the gas in the container 133 from the outlet (not shown). At that time, as shown in FIG. 18C, the mount 137 comes into contact with the claws 143 by the pressure outside the container 133. When the mount 137 comes into contact with the claws 143, the object substrate 147 is pushed against the sheet material 145.

The use of the bonding system 131 allows the sheet material 145 to be bonded to almost the entire area of the object substrate 147 at a uniform pressure. This facilitates preventing variations in display due to a strong pressure that is applied locally to the thinned mother substrate 65$m$ or the second substrate 65, if it is the object substrate 147.

While the display panels 3, 10, and 20 are constructed such that the light-shielding films 85 are disposed at a position adjacent to the display surface 9 relative to the pixels 7, the position of the light-shielding films 85 is not limited to that but may be disposed at a position adjacent to the bottom surface 23 relative to the pixels 7.

In the case of a display panel 30 in which the light-shielding films 85 are disposed at a position adjacent to the bottom surface 23 relative to the pixels 7, the filter substrate 14 is disposed at a position adjacent to the bottom surface 23 relative to the liquid-crystal panel 11, as shown in FIG. 19 which is a cross-section of the display panel 30 taken along line VII-VII in FIG. 6.

The display panel 30 has the same structure as the display panels 3, 10, and 20 except that the filter substrate 14 is disposed at a position adjacent to the bottom surface 23 relative to the liquid-crystal panel 11 and the positions of the light-shielding films 85 relative to the pixel groups 43 are different. Accordingly, the structures of the display panel 30 same as those of the display panels 3, 10, and 20 are given the same numerals and their detailed description will be omitted.

As shown in FIG. 19, the third substrate 81 of the filter substrate 14 of the display panel 30 is constructed such that the outward surface 82$a$ is opposed to the bottom surface 23, and the counter surface 82$b$ is opposed to the display surface 9. The overcoating layer 87 of the filter substrate 14 is bonded to the second surface 53$b$ of the first substrate 51 of the driving-element substrate 15 with the adhesive 89, with the counter surface 82$b$ opposed to the driving-element substrate 15.

The polarizer 13$a$ is disposed on the outward surface 82$a$ of the third substrate 81, while the polarizer 13$b$ is disposed on the outward surface 66$a$ of the second substrate 65.

Figure 20:
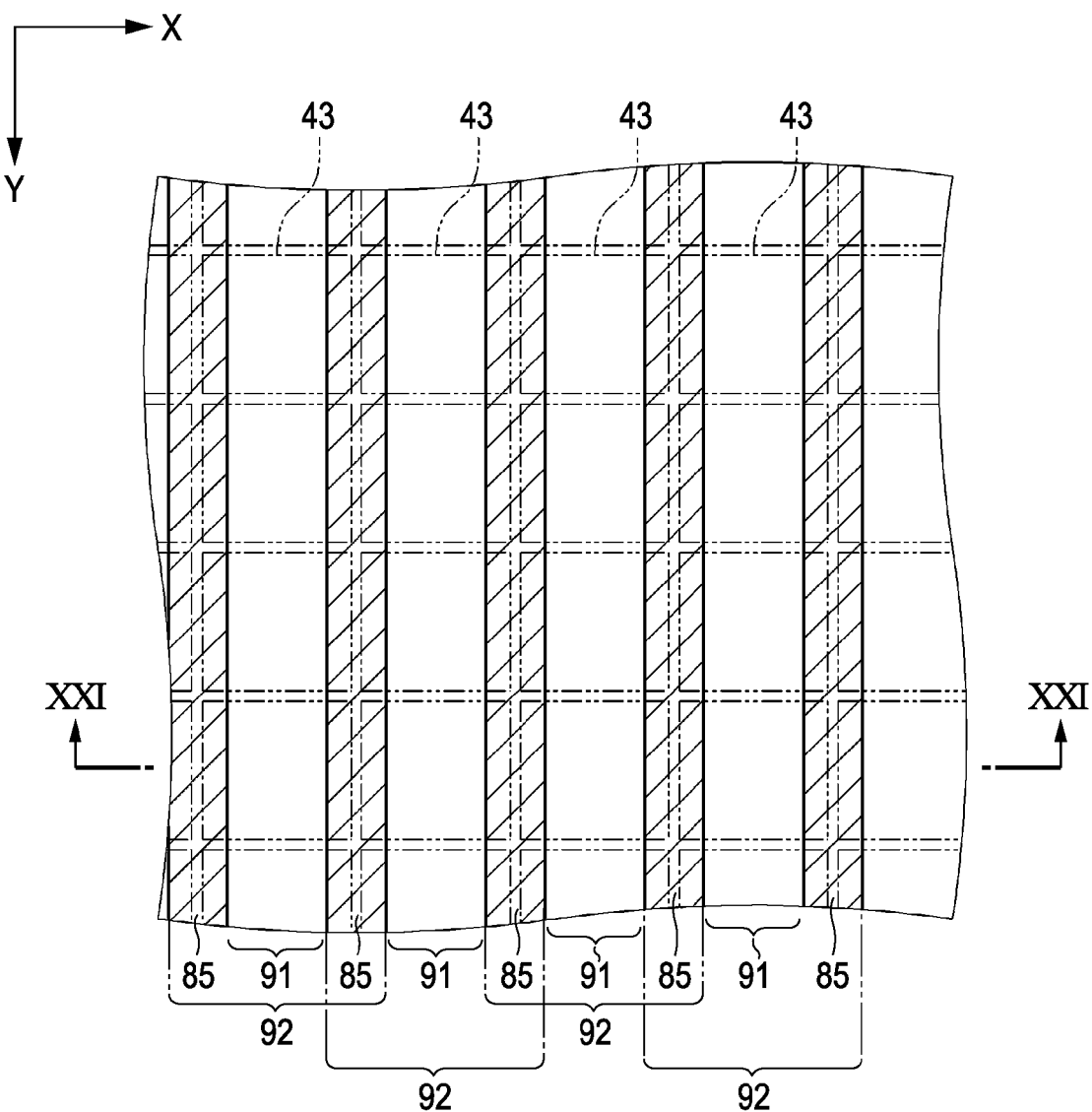
FIG. 20 is a plan view of light-shielding films and pixel groups of the display panel of this embodiment.

As shown in FIG. 20 which is a plan view of the light-shielding films 85 and the pixel groups 43, the light-shielding films 85 of the display panel 30 are each disposed between the pixel groups 43 adjacent in the X-direction. The opening 91 is disposed across the first pixel 7$_1$ and the second pixel 7$_2$ of each of the pixel groups 43. In FIG. 20, the light-shielding films 85 are hatched for illustrative purpose.

In the display panel 30, the light from the illumination system 5 passes through the opening 91 between the light-shielding films 85 into the pixels 7.

Figure 21:
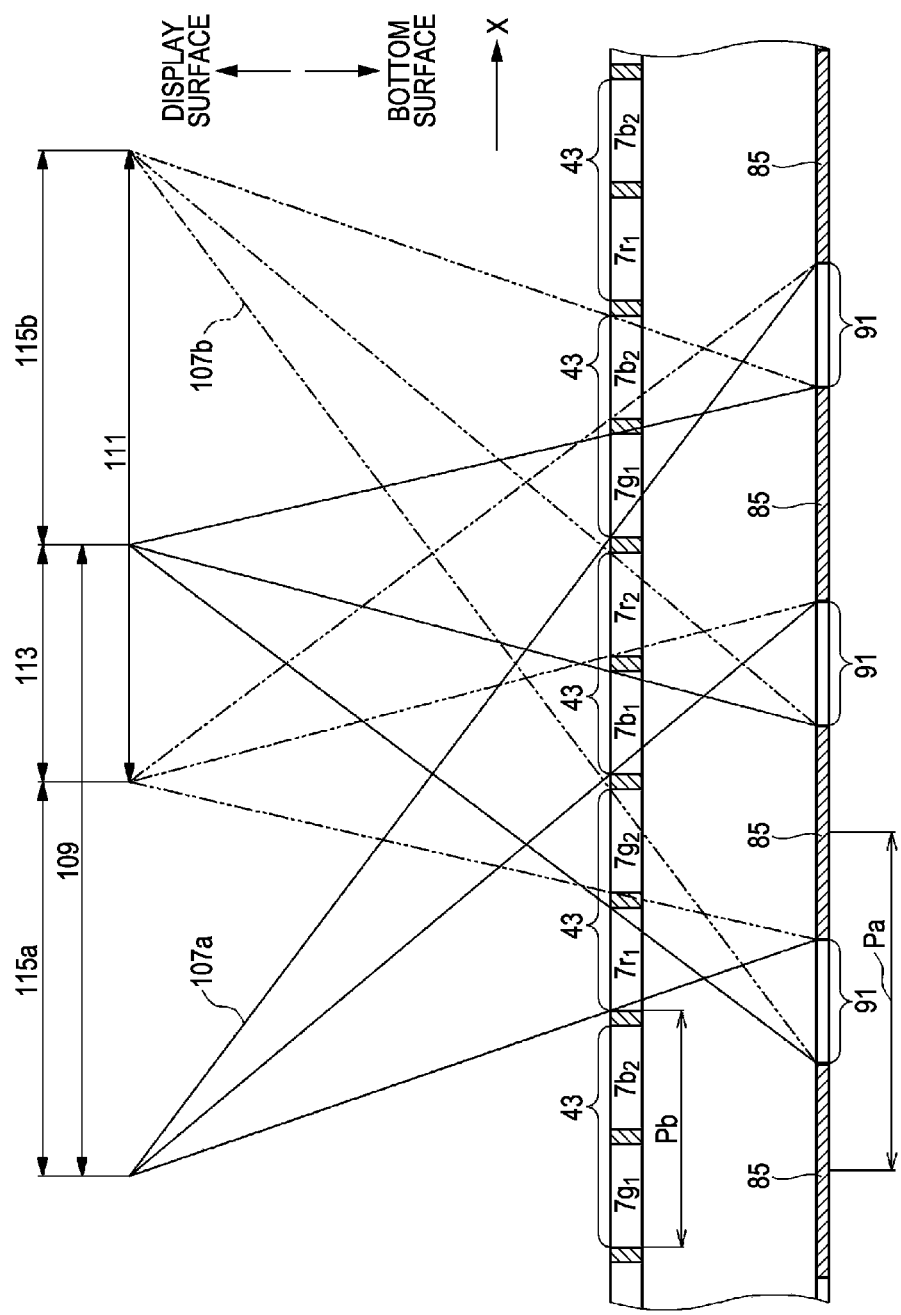
FIG. 21 is a schematic cross-sectional view of the plurality pixel groups and the plurality of light-shielding films of the display panel of this embodiment.

At that time, the lights 107$a$ incident on the first pixels 7$r_1$, 7$g_1$, and 7$b_1$ through the openings 91 reach the first range 109, as shown in FIG. 21 which is a schematic cross-section of the plurality of pixel groups 43 and the light-shielding films 85.

The lights 107$b$ incident on the first pixels 7$r_2$, 7$g_2$, and 7$b_2$ through the openings 91 reach the second range 111. The cross-section shown in FIG. 21 corresponds to the cross-section taken along line XXI-XXI in FIG. 20.

The light-shielding films 85 of the display panel 30 have the function of allowing the lights 107$a$ from the first pixels 7$_1$ to the first range 109 to pass therethrough, and the lights 107$b$ from the second pixels 7$_2$ to the second range 111 to pass therethrough. Thus, directional display can be executed in which the first image is displayed in the first range 109 and the second image is displayed in the second range 111 different from the first range 109.

In the case of the display panel 30, the interval Pa between the light-shielding films 85 adjacent in the X-direction is set longer than the interval Pb between the pixel groups 43 adjacent in the X-direction.

In the case of the display panel 30, the first substrate 51 corresponds to the substrate and the counter substrate 17 corresponds to the second substrate.

The display panel 30 offers the same advantages as the display panels 3, 10, and 20.

Figure 22:
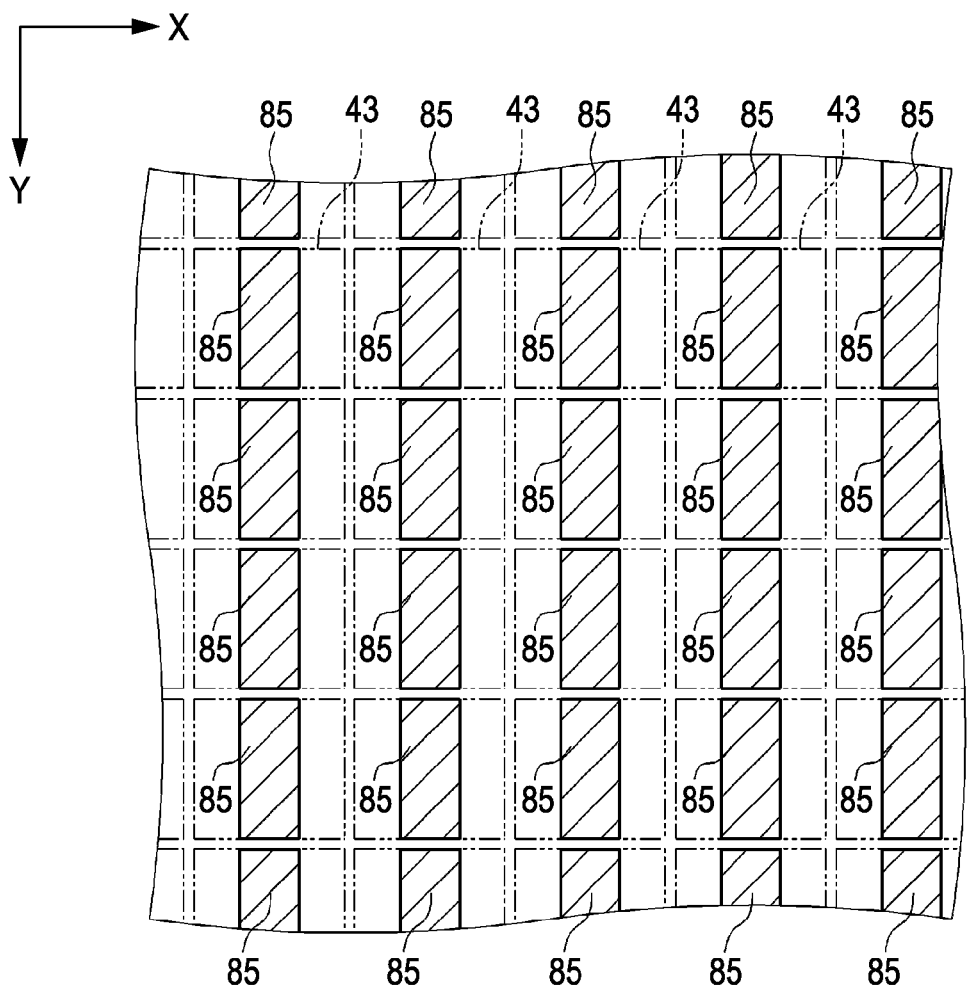
FIG. 22 is a plan view of another example of the light-shielding films of the embodiment.

While the light-shielding films 85 of the display panels 3, 10, and 20 extend across the pixel groups 43 arrayed in the Y-direction, as shown in FIG. 8, the arrangement of the light-shielding films 85 is not limited to that. As shown in FIG. 22, the light-shielding films 85 may be separate in each pixel group 43.

Figure 23:
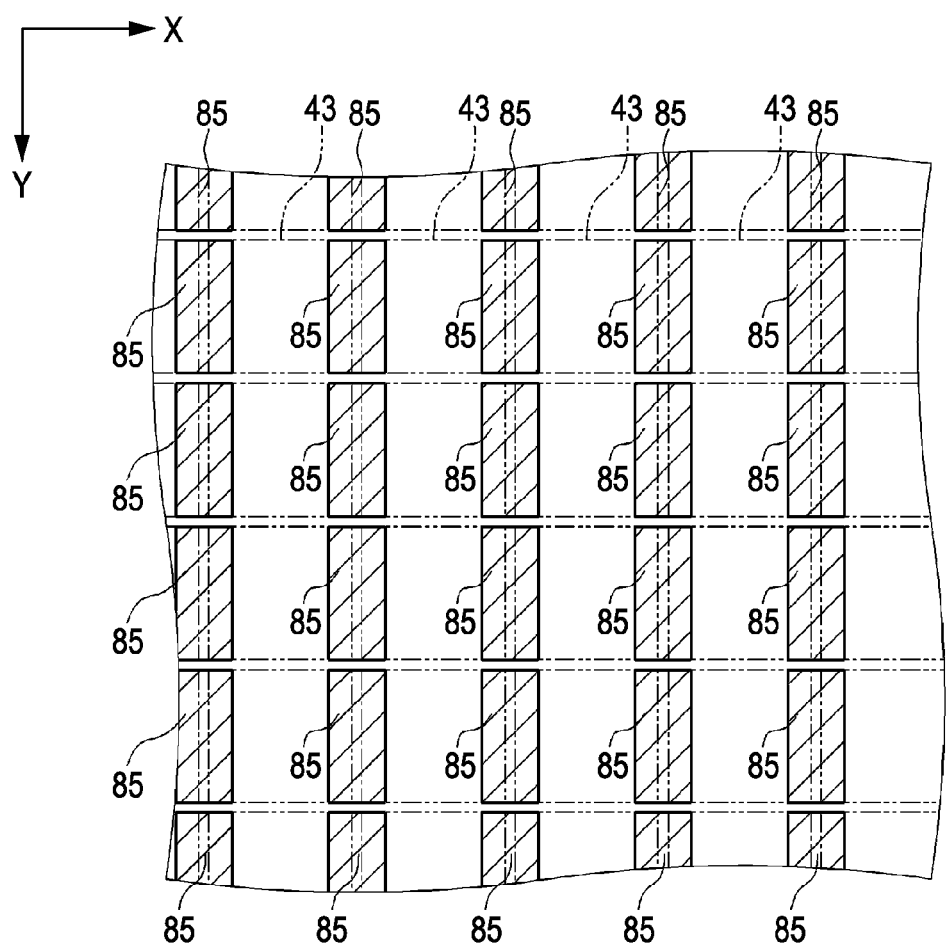
FIG. 23 is a plan view of another example of the light-shielding films of the display panel of the embodiment.

While the light-shielding films 85 of the display panel 30 between the pixel groups 43 adjacent in the X-direction extend across the pixel groups 43 arrayed in the Y-direction, as shown in FIG. 20, the arrangement of the light-shielding films 85 is not limited to that. As shown in FIG. 23, the light-shielding films 85 between the pixel groups 43 adjacent in the X-direction may be separate in each of the pixel group 43 arrayed in the Y-direction.

While the display panels 3, 10, 20, and 30 have been described using the TN-type liquid crystal 19 as an example, the liquid crystal 19 is not limited to that; a fringe field switching (FFS) type, an in-plane switching (IPS) type, a vertical alignment (VA) type, and other various types may be adopted.

Figure 24:
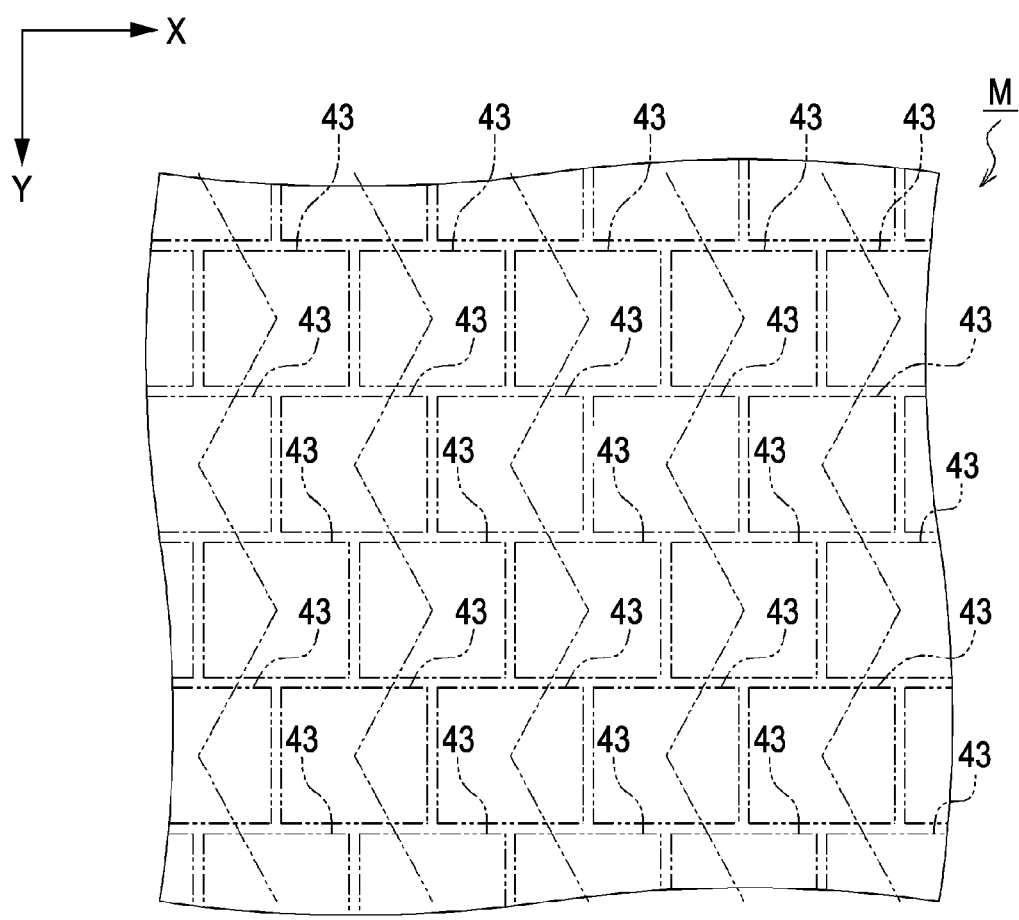
FIG. 24 is a plan view of another example of the array of the pixel groups of the embodiment.
Figure 25:
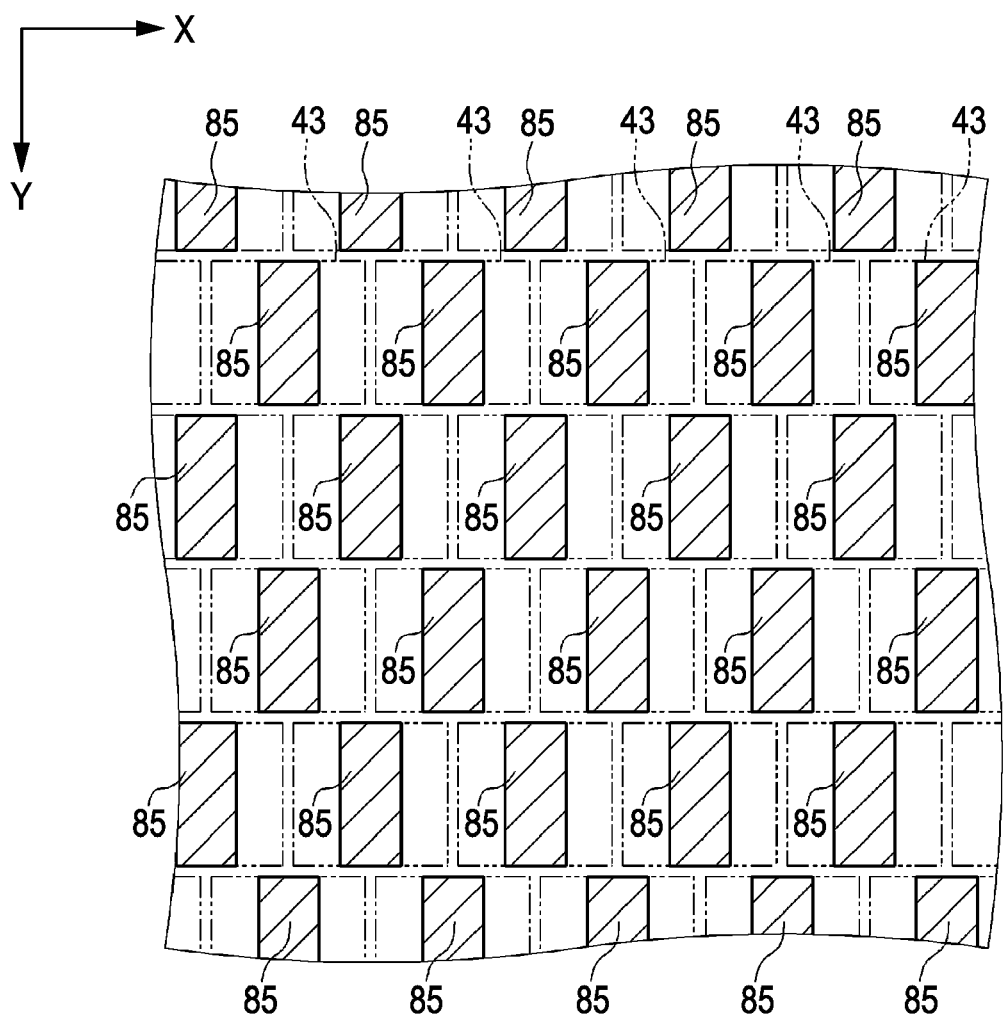
FIG. 25 is a plan view of another example of the light-shielding films of the embodiment.
Figure 26:
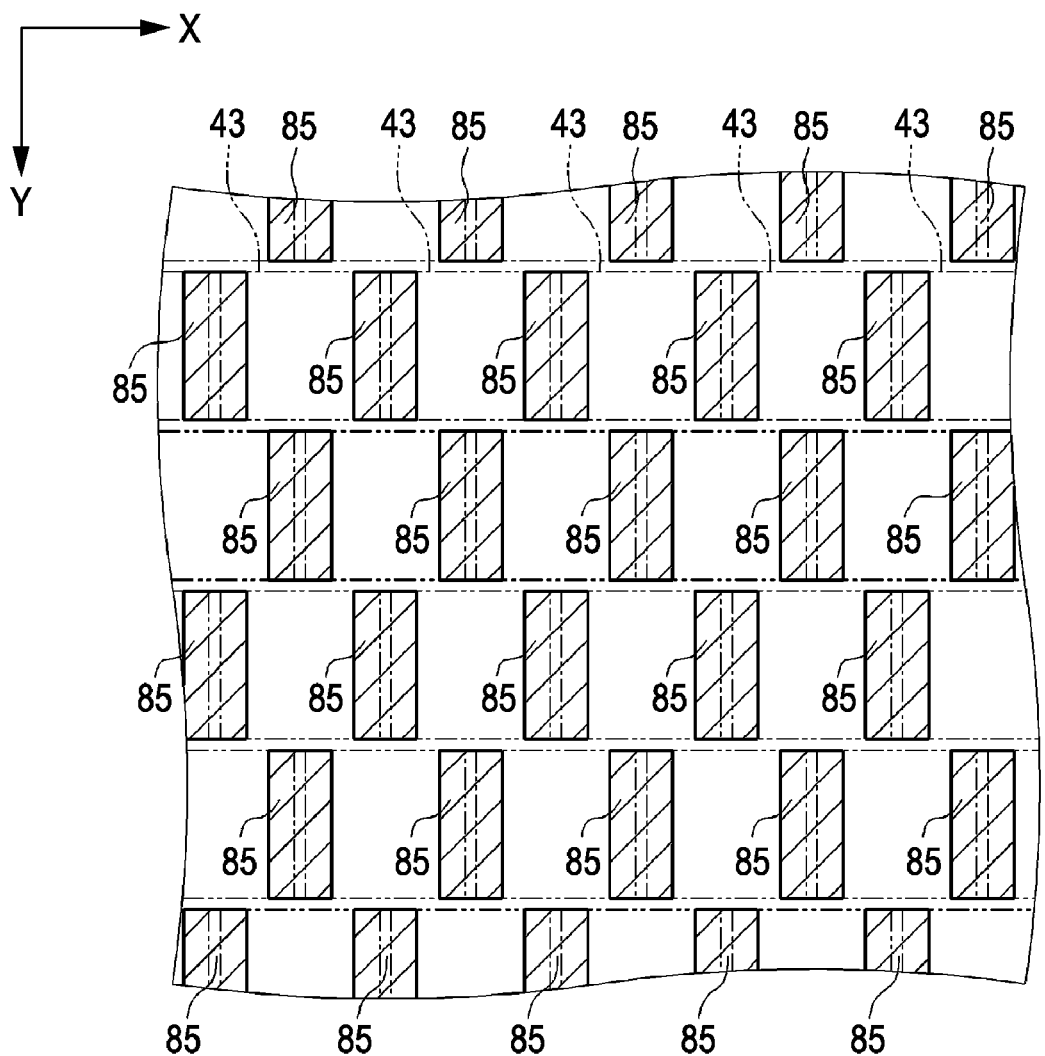
FIG. 26 is a plan view of another example of the light-shielding films of the display panel of the embodiment.

While the display panels 3, 10, 20, and 30 have been described using the pixel groups 43 arrayed in matrix form in the X- and Y-directions, as shown in FIG. 5, as an example, the array of the pixel groups 43 is not limited to that. For example, the pixel groups 43 may be arrayed in a zigzag pattern in the Y-direction as shown in FIG. 24. In the case of the array shown in FIG. 24, the first pixels 7$_1$ and the second pixels 7$_2$ shown in FIG. 4 are alternated in the X-direction and in the Y-direction. In this case, the light-shielding films 85 of the display panels 3, 10, and 20 are provided separately in each of the pixel groups 43, as shown in FIG. 25. The light-shielding films 85 of the display panel 30 are disposed between the pixel groups 43 adjacent in the X-direction, as shown in FIG. 26.

The display panels 3, 10, 20, and 30 have been described using the example in which the filter 92 is used as an optical element, with which directional display is achieved. However, the optical element for directional display is not limited to that. The optical element for directional display may be a lenticular lens. The filter serving as the optical element is not limited to the filter 92 but may be another color filter different from the color filter 73. The directional display can be achieved by a new color filter in place of the filter 92.

Figure 27:
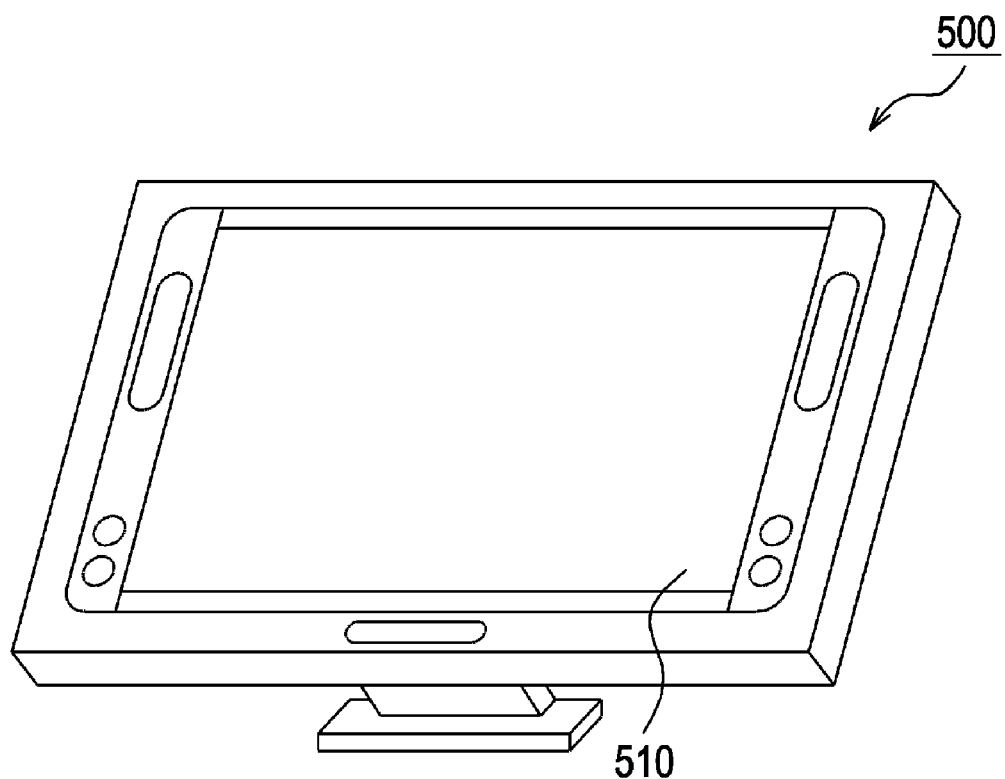
FIG. 27 is a perspective view of an electronic apparatus incorporating the display device of the embodiment.
Figure 28A:
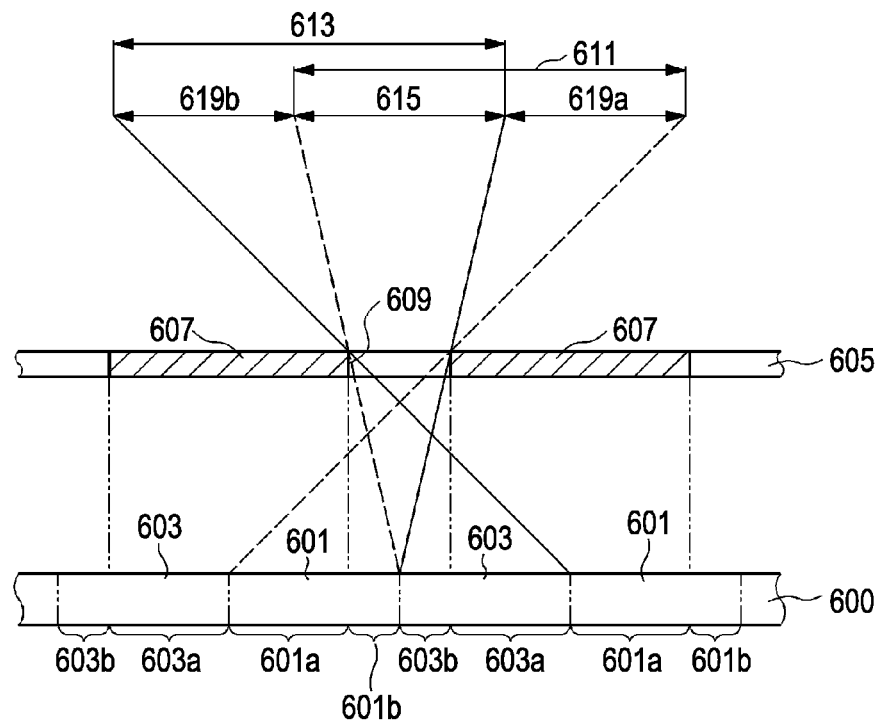
FIG. 28A is a cross-sectional view of a related art illustrating its problems.
Figure 28B:
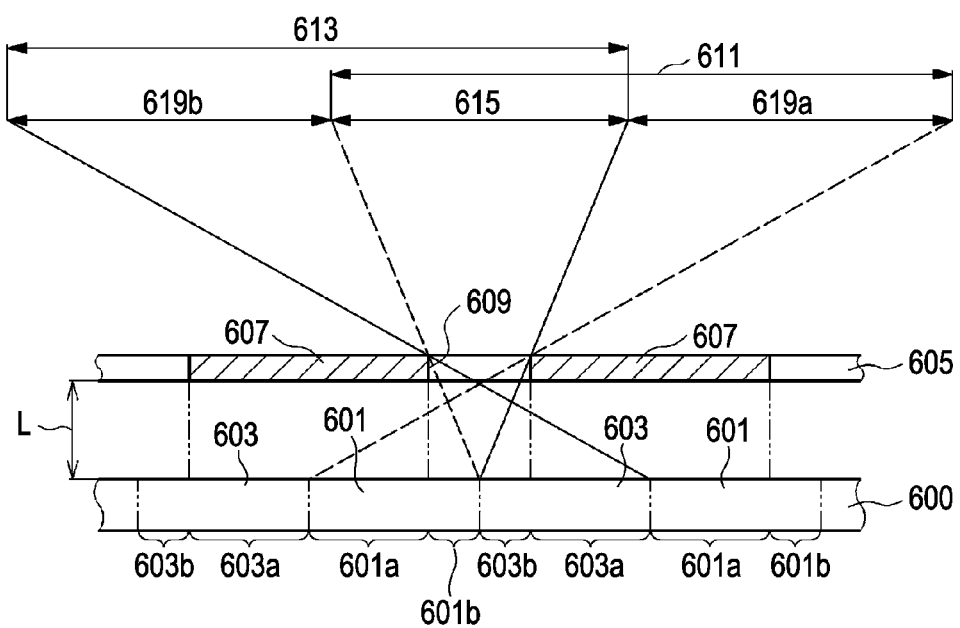
FIG. 28B is a cross-sectional view of the related art illustrating its problems.

The display panels 3, 10, 20, and 30 can be applied to the display device 1. The display device 1 incorporating the display panel 3, 10, 20, or 30 can be applied to a display 510 of an electronic apparatus 500 shown in FIG. 27. This electronic apparatus 500 is a display unit for a car navigation system. The electronic apparatus 500 allows, for example, an image such as a map to be viewed as a first image from a driver seat and an image such as a movie to be viewed as a second image from a passenger seat.

Moreover, the electronic apparatus 500 can reduce the range 113 in which the first image and the second image are superimposed and allows the first image to be viewed from the wide preferred viewing range 115$a$ and the second image to be viewed from the wide preferred viewing range 115$b$.

Examples of the electronic apparatus 500 are not limited to the display unit for a car navigation system, but include portable phones, mobile computers, digital still cameras, digital video cameras, on-vehicle equipment, audio equipment, and other various electronic apparatuses.

The entire disclosure of Japanese Patent Application No. 2007-276066, filed Oct. 24, 2007 is expressly incorporated by reference herein.

What is claimed is:

1. A method for manufacturing an electro-optic device comprising:
    a display surface;
    a plurality of pixels including at least a first pixel for forming a first image and a second pixel for forming a second image, the pixels emitting light toward the display surface;
    a filter section that allows, of the light, light emitted from the first pixel to a first range through the display surface to pass through, and light emitted from the second pixel to a second range through the display surface to pass through; and
    a substrate between the plurality of pixels and the filter section;
    the method comprising:
    providing the filter section on the substrate, with a distance between the substrate and the filter section kept at a distance set according to the thickness of the substrate.

2. The method for manufacturing the electro-optic device according to claim 1, wherein
    in providing the filter section on the substrate, the substrate and the filter section are bonded together with an adhesive.

3. The method for manufacturing the electro-optic device according to claim 2, wherein:
    in providing the filter section on the substrate, the distance between the substrate and the filter section is kept at the distance according to the amount of the adhesive.

4. The method for manufacturing the electro-optic device according to claim 1, the method further comprising:
    providing a spacer layer for controlling the distance on at least one of the substrate and the filter section before providing the filter section on the substrate.

5. The method for manufacturing the electro-optic device according to claim 4, wherein
    in providing the spacer layer, the spacer layer is disposed on the substrate.

6. The method for manufacturing the electro-optic device according to claim 4, wherein
    in providing the spacer layer, the spacer layer is disposed on the filter section.

7. The method for manufacturing the electro-optic device according to claim 1, the method further comprising:
    decreasing the thickness of the substrate before providing the filter section on the substrate.

8. The method for manufacturing the electro-optic device according to claim 7, wherein:
    the plurality of pixels are disposed between the substrate and a second substrate joined to the substrate in such a manner as to be opposed to the substrate; and
    in decreasing the thickness of the substrate, the substrate is decreased in thickness, with the second substrate joined to the substrate.

9. The method for manufacturing the electro-optic device according to claim 1, the method further comprising:
    measuring the thickness of the substrate before providing the filter section on the substrate.

10. An electro-optic device comprising:
    a display surface;
    a plurality of pixels including at least a first pixel for forming a first image and a second pixel for forming a second image and emitting light toward the display surface;
    a filter section that allows, of the light, light emitted from the first pixel to a first range through the display surface to pass through, and light emitted from the second pixel to a second range through the display surface to pass through;
    a substrate between the plurality of pixels and the filter section; and
    a spacer layer between the substrate and the filter section, the spacer layer controlling a distance between the substrate and the filter section.

* * * * *